(12) United States Patent  (10) Patent No.: US 8,733,766 B2
Nieman  (45) Date of Patent: May 27, 2014

(54) CONVERTIBLE CONVEYANCE METHOD AND APPARATUS

(75) Inventor: Timothy R. Nieman, North Salt Lake, UT (US)

(73) Assignee: Timothy R. Nieman, North Salt Lake, UT (US)

( * ) Notice: Subject to any disclaimer, the term of this patent is extended or adjusted under 35 U.S.C. 154(b) by 80 days.

(21) Appl. No.: 13/302,114

(22) Filed: Nov. 22, 2011

(65) Prior Publication Data

US 2012/0126499 A1    May 24, 2012

Related U.S. Application Data

(60) Provisional application No. 61/416,538, filed on Nov. 23, 2010.

(51) Int. Cl.
*B62B 1/00* (2006.01)

(52) U.S. Cl.
USPC ....... 280/47.17; 280/47.41; 280/30; 280/652; 280/645

(58) Field of Classification Search
USPC ......... 280/30, 78, 47.32, 1.5, 47.18; 224/153, 224/184
See application file for complete search history.

(56) References Cited

U.S. PATENT DOCUMENTS

| | | | |
|---|---|---|---|
| 3,560,015 A | 2/1971 | Tracy et al. | |
| 4,109,933 A | 8/1978 | O'Brian et al. | |
| 4,138,140 A | 2/1979 | O'Brian et al. | |
| 4,190,260 A | 2/1980 | Pearce | |
| 5,607,174 A | 3/1997 | Ambrogio | |
| 5,687,978 A * | 11/1997 | Rhodes et al. | 280/30 |
| 5,908,202 A | 6/1999 | Leger et al. | |
| 6,446,989 B1 | 9/2002 | Intengan | |
| 6,805,269 B2 | 10/2004 | Lockard | |
| 6,942,228 B2 * | 9/2005 | Bunce et al. | 280/30 |
| 7,017,939 B2 | 3/2006 | Darling | |
| 7,243,939 B2 | 7/2007 | Lowe | |
| 7,334,803 B2 | 2/2008 | Gonzalez | |
| 7,354,049 B2 | 4/2008 | Schmidt | |
| 7,484,737 B2 | 2/2009 | Satorius | |
| 7,547,024 B1 | 6/2009 | Dell | |
| 7,597,341 B2 | 10/2009 | Russo | |
| 7,600,764 B1 | 10/2009 | Parker | |
| 7,617,956 B1 | 11/2009 | Sabbah | |
| 7,703,776 B1 | 4/2010 | Nugent | |
| 7,717,309 B1 | 5/2010 | Lehmberg | |
| 7,731,204 B2 | 6/2010 | Turner et al. | |
| 7,841,446 B2 | 11/2010 | Leong et al. | |
| 2004/0183263 A1 * | 9/2004 | Joncourt | 280/1.5 |

* cited by examiner

*Primary Examiner* — John Walters
*Assistant Examiner* — James Triggs
(74) *Attorney, Agent, or Firm* — Stoel Rives LLP

(57) ABSTRACT

Devices and methods for convertibly changing the means and carrying capacity of a pedestrian are provided. Specifically the present disclosure comprises a backpack capable of being converted into a wheelbarrow for the purpose of transporting increased loads in emergency or varying conditions. The device may include a frame and satchel whereby a series of components are fastened to the frame in order provide for implements such as handles and rolling wheels for transportation of increased loads. The components of the system may include, for example, a frame, a satchel, handles, a wheel, and an axle. When assembled to convert the pack to a wheelbarrow configuration, the device may increase the safe carrying capacity of a pedestrian from 50-100 lbs. to 200-300 lbs. or more.

20 Claims, 34 Drawing Sheets

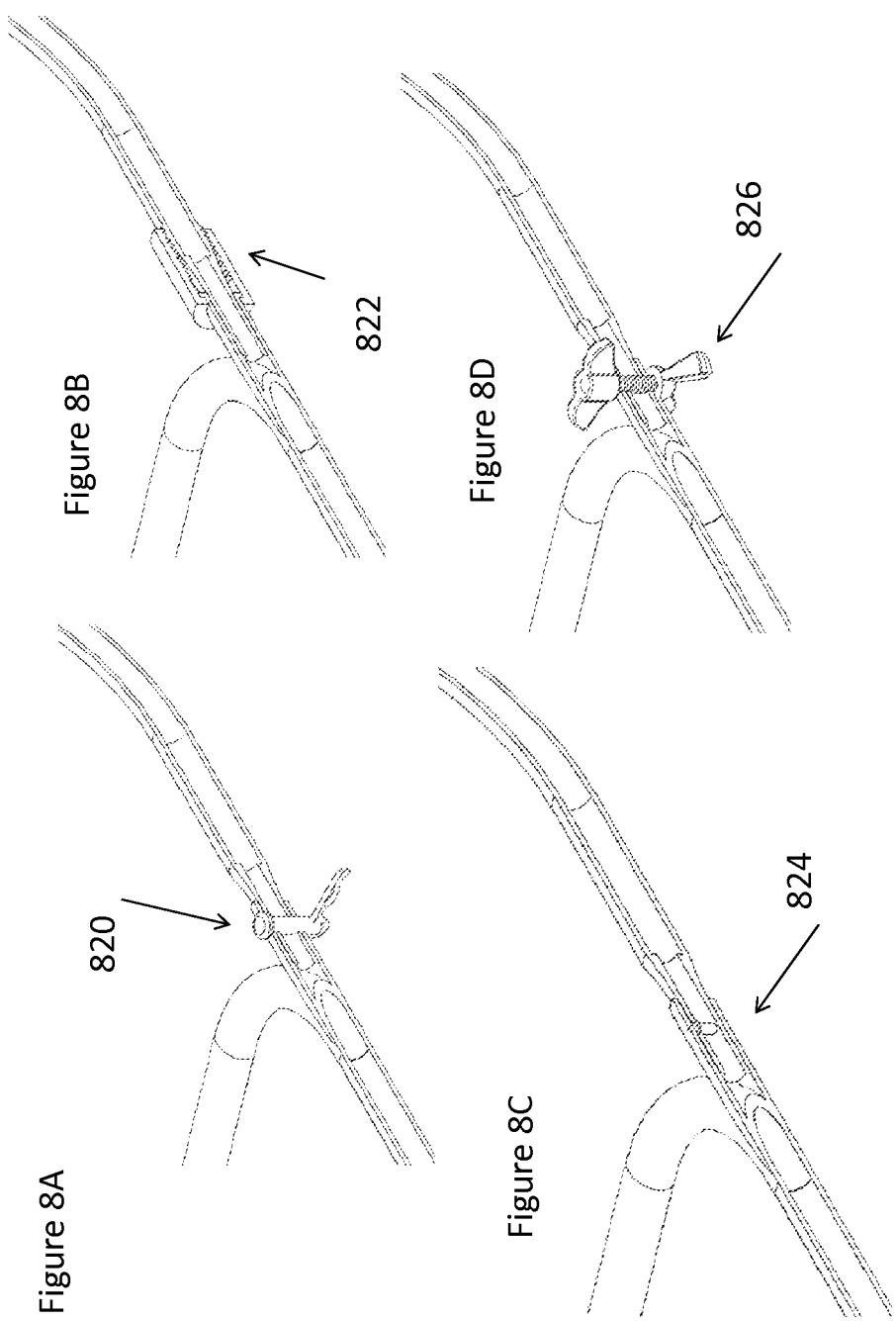

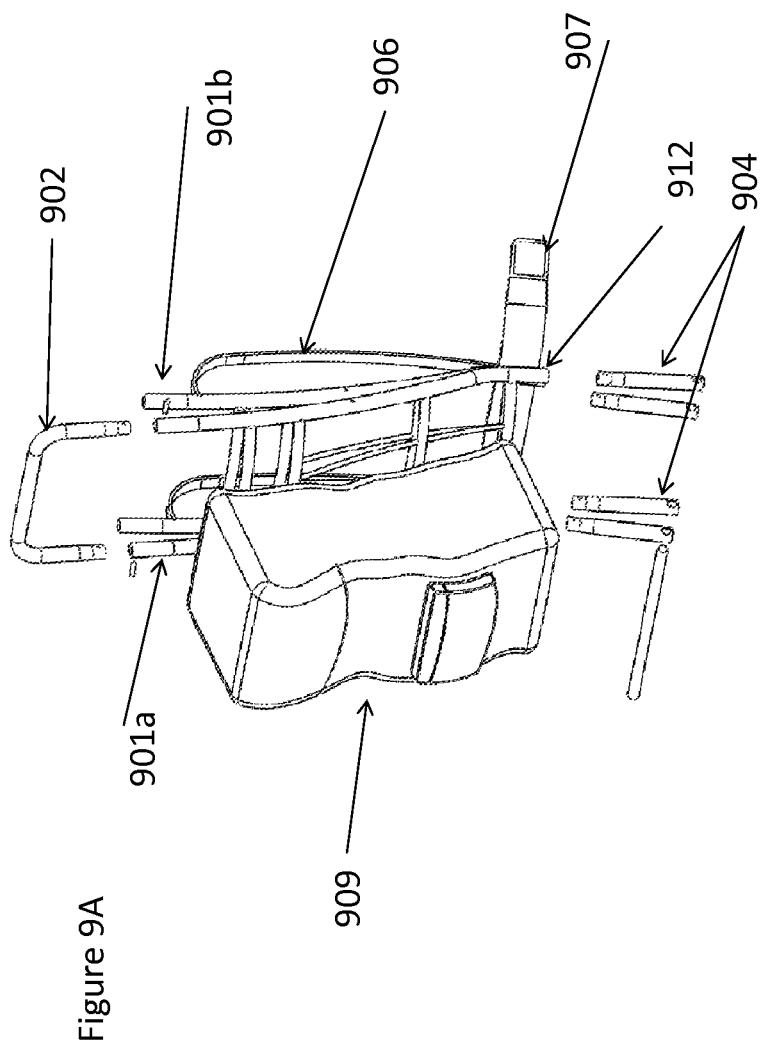

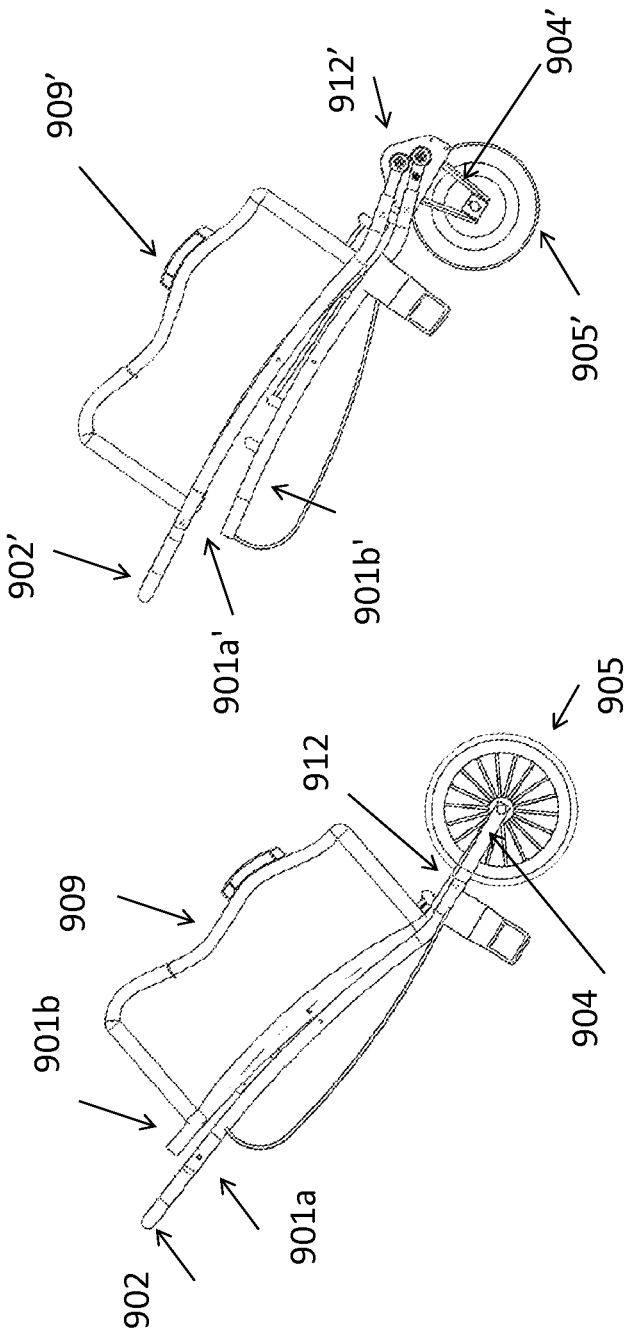
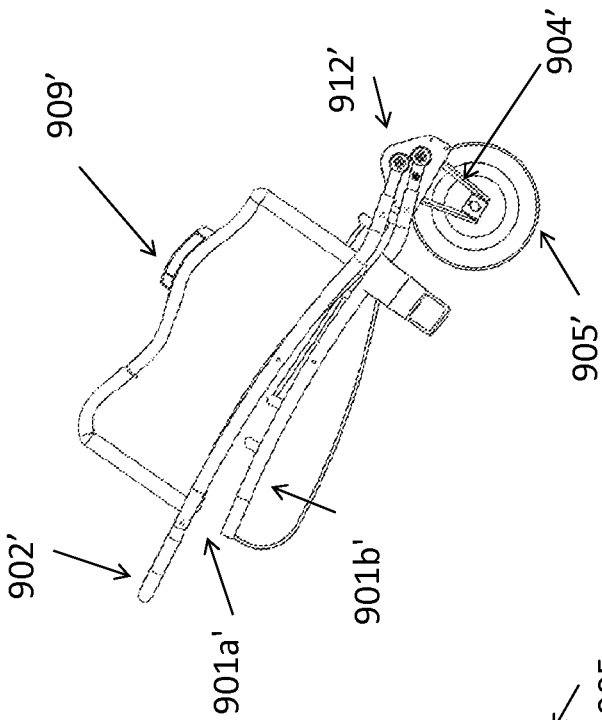

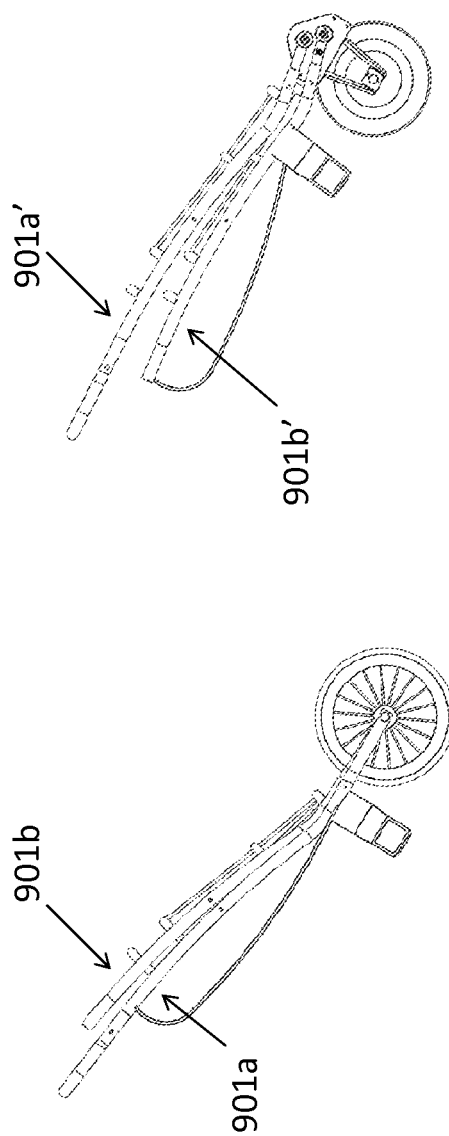

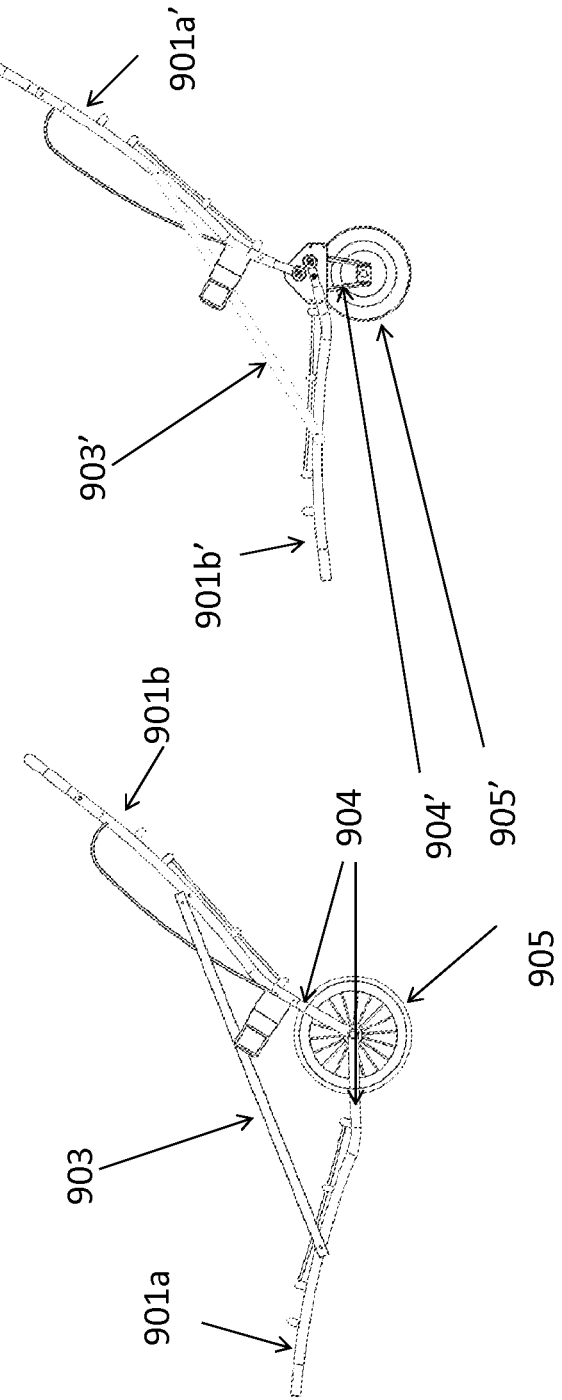

CONVERTIBLE CONVEYANCE METHOD AND APPARATUS

RELATED APPLICATIONS

The utility application claims priority to U.S. Provisional Application No. 61/416,538, filed on Nov. 23, 2010, entitled "Convertible Conveyance Method and Apparatus," which is herein incorporated by reference in its entirety.

FIELD OF THE INVENTION

The present invention relates to backpack devices and methods of transporting loads. It more particularly pertains to a new backpack that is convertible into a wheelbarrow that allows for carrying of additional loads.

BACKGROUND

The use of backpacks is well known in prior art as is the use of wheelbarrows and carts. There are described a number of folding wheelbarrows where the primary purpose is to collapse a normal wheelbarrow for storage or where the wheelbarrow handles are capable of articulation such that it can be more easily or comfortably used by a particular individual. Further there have been applications where a backpack has been attached to a cart such that the load is more easily carried—for example, luggage whereby the pack is attached to a small wheeled cart for pulling behind a pedestrian.

SUMMARY OF THE INVENTION

While the devices described above fulfill their respective objectives and requirements, there remains a need for a device that is primarily a backpack but can be converted to carry substantial loads such as in transporting game or injured persons from remote areas. The present disclosure relates to a backpack such as a frame backpack for backpacking that may be converted into a wheelbarrow or cart assembly for the purpose of transporting loads, for example, in case of emergency or other need.

In some embodiments, the device comprises a frame backpack with an integral frame and attached pack/satchel. A frame may be accommodated with shoulder straps and a waist strap for wearing on the back, for example, for the purpose of carrying loads such as a tent, food, water, and the like. The present disclosure may extend the functionality of such a device by providing for, in some embodiments, attachment points whereby a wheel or handles can be attached to convert the pack to a wheelbarrow. Accordingly, the present invention may allow for the optional use of the device as a backpack or for transportation of materials in a means such as a wheelbarrow, in some embodiments. As used herein, the term "wheelbarrow" should be construed broadly, referring to any wheeled cart for transporting loads. This definition includes devices with one or multiple wheels and/or one or multiple handles.

As a backpack, the device may be utilized to transport materials such as a tent, water, supplies or other items. During this method of transport there may be included in the cargo space a series of rods, pins, and a wheel that may be utilized to convert the frame of the pack into, for example, a wheelbarrow apparatus. These additional components may rest within the cargo space in a component state rather than complicating the pack assembly through having permanent attachment. In some embodiments, these components could, for example, be provided in a separate pouch whereby they could be maintained as a complete set and yet be packed within the cargo space of the main pack space. In some embodiments, the device may be understood as providing a frame, wherein the frame of the pack itself becomes the backbone or tray of the wheelbarrow or cart rather than the backbone of the wheelbarrow or cart being provided separately and the pack being attached to that frame. By providing the pack frame as the backbone of the device, there exists an opportunity to use this frame as a location for hardpoint attachments of structures for conversion to the wheelbarrow configuration.

When additional carrying capacity is desired or needed, for instance in the case of game transport or when needed as a litter for transporting an injured party, the additional components may be removed from the cargo space and assembled to create the wheelbarrow structure. In this event the soft cargo space (satchel area) may then be used either to contain the packed materials or to support or cushion the injured party.

When not converted to the wheelbarrow configuration, the device may operate as a simple backpack, with the associated reduction in bulk allowing for improved mobility of the pedestrian in opposition to what may be possible with a wheelbarrow configuration. Therefore, the convertible nature of the invention may allow for the convenience of portability when in the backpack configuration and the additional load-carrying capability of the wheelbarrow when needs demand it.

Above, the broad application of the device has been outlined. Below, additional features of the device will be further described. The summary, detailed description, claims, and FIGS. comprise the disclosure of the current device. The scope of the invention is defined by the appended claims.

BRIEF DESCRIPTION OF THE DRAWINGS

Additional features and advantages of the current disclosure will be apparent from the detailed description that follows, taken in conjunction with the accompanying drawings, which together illustrate, by way of example, features of the invention, and wherein:

FIG. 8A is a cutaway view of one embodiment of an attachment mechanism.

FIG. 8B is a cutaway view of another embodiment of an attachment mechanism.

FIG. 8C is a cutaway view of another embodiment of an attachment mechanism.

FIG. 8D is a cutaway view of another embodiment of an attachment mechanism.

FIG. 9A is a partially exploded view of another embodiment of an integrated transportation device.

FIG. 9D is a side view of the device of FIG. 9A in a wheelbarrow configuration.

FIG. 9E is a side view of the device of FIG. 9C in a wheelbarrow configuration.

FIG. 9F is a side view of the device of FIG. 9A in another wheelbarrow configuration.

FIG. 9G is a side view of the device of FIG. 9C in another wheelbarrow configuration.

FIG. 9J is a side view of the device of FIG. 9A in another wheelbarrow configuration.

FIG. 9K is a side view of the device of FIG. 9C in another wheelbarrow configuration.

DETAILED DESCRIPTION

Definitions

Figure 1A:
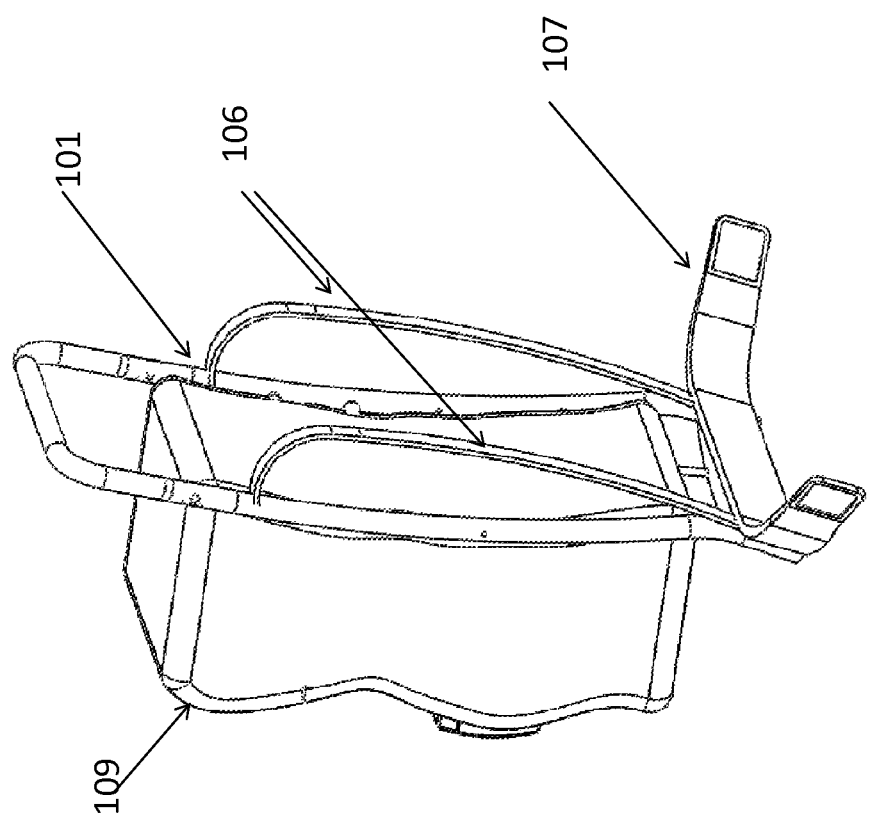
FIG. 1A is a perspective view of an integrated transportation device in a backpack configuration.

It is to be understood that the current disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only, and is not intended to be limiting.

It must be noted that, as used in this specification and the appended claims, the singular forms "a," "an," and "the" include plural referents unless the context clearly dictates otherwise. Thus, for example, reference to "a wheel for conveyance" could include one or more of such wheels based on the configuration, and reference to "the handle" includes reference to one or more of such handles.

The phrases "connected to," "coupled to," and "in communication with" refer to any form of interaction between two or more entities, including mechanical, electrical, magnetic, electromagnetic, fluid, and thermal interaction. Two components may be coupled to each other even though they are not in direct contact with each other. For example, two components may be coupled to each other through an intermediate component.

As referenced above, the term "wheelbarrow," as used herein, should be construed broadly, referring to any wheeled cart for transporting loads. This definition includes devices with one or multiple wheels and/or one or multiple handles. The device need not have all these listed features in order to constitute a "wheelbarrow" under this definition.

Similarly, a device may be convertible from a backpack configuration to a wheelbarrow configuration. The term "backpack configuration" refers to a configuration or assembly of the device generally configured for the transportation of loads by coupling, strapping, or otherwise attaching the load to a person. Shoulder straps, belt straps, and the like may be possible, though not necessary, elements of such a configuration. Moreover, a wheelbarrow configuration is a configuration or assembly of the device whereby the load is configured to be transported through use of the device as a wheelbarrow, as broadly defined above.

Finally, the term "converting" as used in connection with transforming the device from one configuration to another, refers broadly to the process of transforming the device. This term is not meant to require particular steps, or a particular order of operations, in all instances. Furthermore, any examples referring to conversion of the device from a backpack to a wheelbarrow, or vice versa, are applicable to the same operations in reverse—that is, converting the device from a wheelbarrow to a backpack or vice versa.

Description

A frame pack may include an integrated frame incorporating hardpoints for attachment of components facilitating conversion of the pack to a wheelbarrow apparatus. In some embodiments, the device features an integrated frame and pack that can be utilized by normal means as a conveyance of materials for camping or other use via shoulder straps allowing for wearing of the pack. The device may include a series of components that can be utilized to convert the basic backbone of the frame into a wheelbarrow for extending the carrying capacity from what can be carried on the user's back, for example. These components may include a wheel, an axle, extension rods, and pins or fastening components to fasten the components to the frame of the pack. In some instances, the assembly of these components allows for the change in transportation method from a worn pack to a wheeled conveyance whereby the user pushes or pulls the conveyance to carry the load. Said load may either be carried in the cargo area of the pack (satchel area), strapped to the pack or its frame, or a combination thereof.

The pack, frame, and additional components can be made of any material known in the wheelbarrow or pack industry. Generally any rigid plastic, polymeric, carbon-based, or metallic material can be used as the structure for the pack frame and for the associated structures that serve as the handles and axle assembly. In some embodiments, the frame is intended to be a scaffolding that is designed to be structurally relatively rigid while as lightweight in construction as possible. Construction may be of tubular aluminum, polymers (often fiber filled), and in some instances shaped metals or combinations intended to be both as rigid and as light as possible. The current disclosure further includes strengthening in some instances, such as where necessary to accommodate the attachment points for the additional components (wheel and handles). In order to maintain lightweight construction and the additional strength necessary to accommodate loads of 200 lbs. or more, the current disclosure may also utilize other materials such as carbon fiber tubes in order to provide added strength.

In addition to the materials utilized, the current disclosure also relates to geometrical configurations that may lower the center of gravity and improve the stability of the device when loaded. As can be expected in outdoor or backcounty situations, the likelihood of inconsistent terrain may result in a significant increase in difficulty when transporting loads on a single-wheeled device. In order to combat this, the current invention provides for the load being located in the immediate vicinity of the wheel in some embodiments. For example, in one configuration the wheel is located at one end of the pack frame allowing for increased leverage and for the center of gravity to be located immediately next to the axle. In another configuration the wheel may be located directly underneath the center of gravity resulting in a more balanced and stable load and further reducing the leverage needed to lift the load. By this mechanism the user is only then needed to stabilize the load laterally rather than both lifting and stabilizing the load. The result is a design that may be less likely to tip over.

Further, in order to improve the lateral stability of the device, the current design may change the vertical height of the load in comparison to the handles. Reducing the height of the load may create a pendulum type effect of the load in contrast to the handles, resulting in a lower center of gravity and therefore less potential for the load to shift or rotate the device laterally. In conjunction with the stability provided by the wheel location, the user may be provided with an ability to carry increased loads across uneven terrain. The present disclosure includes embodiments comprising a metal tubular frame with a wheel attached on one end of the frame and handles attached at the other end, resulting in a center of gravity located close to the wheel axle but between the axle and the handles.

In another embodiment, the wheel can be located midway under the frame such that the center of gravity can be located vertically over the axle. The axis of the handles can be coincident with the center axis of the wheel as in FIG. 1C, or may be located such that the axis of the handles is located at some vertical distance from the center axis, such as in the embodiment of FIG. 2A, thereby changing the stability of the device.

In still other embodiments the single wheel may be substituted by multiple wheels on the same axle or multiple wheels on multiple axles in order to alter either the stability of the load, the load carrying capacity, or the structural strength. Likewise, handles could be either two handles separated at roughly the width of the user's waist for carrying said load or could be a single handle attached to a belt loop or other attachment point for use in a fashion such as a trailer. It will be understood that a combination of handles and belt loop type handles could be utilized resulting in three or more handles to increase stability. Further, handles could be located on both ends of the device to allow for multi-person use via a push and pull method. It should also be understood that materials utilized can be varied with equivalent results based on material strength and weight—for example, carbon fiber tubes or channels instead of metallic tubes, or formed polymeric structures instead of tubular shapes.

The method of addition of handles or additional structures onto the pack can also have numerous permutations. For example it will be obvious to those skilled in the art that, in opposition to attachments being made of separate components attached to the frame, the additional extensions necessary for creation of the handles may be carried within the frame and slidably extended to create handles as needed. It should also be understood that these components may be foldably stored within the frame mechanism, for example, in a telescoping arrangement.

Collectively, the components of the system may function to facilitate carrying of loads via conventional means of a pack worn on the back or as a wheelbarrow apparatus. The present disclosure may allow for the conversion of these two methods of load transportation to be convertible with a single device. The ability to convert the device may allow for changing the mode of load transportation as the situation demands. This may allow the user to use the device to carry lighter loads on the back, for example, to access backcountry areas. When necessary, this same device can then be utilized to carry loads in a wheelbarrow fashion when the load is too heavy for wearing on the back of the user, for example.

The frame and associated components including the wheel can be made of any material known in the art, including, but not limited to, aluminum and its alloys, magnesium and its alloys, steel and its alloys, polymers including both thermoplastic and thermosetting, composite structures such as fiberglass or carbon fiber, and ceramics. Additionally various components may be made of any combination of different materials, such as an embodiment that includes an aluminum frame combined with carbon fiber handles and a polymer or fiber-reinforced polymer wheel.

Turning specifically to FIGS. 1A-1D, there are shown the various components of one embodiment of the device. FIG. 1A shows the assembly in its backpack configuration including a pack frame 101 that provides the basic platform for many alternate configurations of the present device. The frame 101 may define a longitudinal direction or axis along the length of the frame 101, and a transverse direction across the frame 101. The longitudinal direction may be defined as the direction along the frame 101 that is configured to be substantially vertical when the frame 101 is configured for use as a backpack and fastened to the back of a user. The frame 101 could be either an internal or external frame referring to whether the pack or satchel component goes over or onto the frame 101 in the normal manner. It should be noted that, because of the various configurations of possible pack or satchel components, these components may not be illustrated in all of the figures. The frame 101 may be understood as providing a structural foundation for the device in many of its configurations. The exact form of the illustrated frame is exemplary only, and the precise shape and configuration of submembers forming the frame 101 may be varied. FIG. 1A further illustrates how a pack or satchel 109, shoulder straps 106, and/or a belt 107 may be coupled to the frame 101. In particular, one or all of these components may be coupled to the frame 101 when the device is configured in a backpack configuration.

Figure 1B:
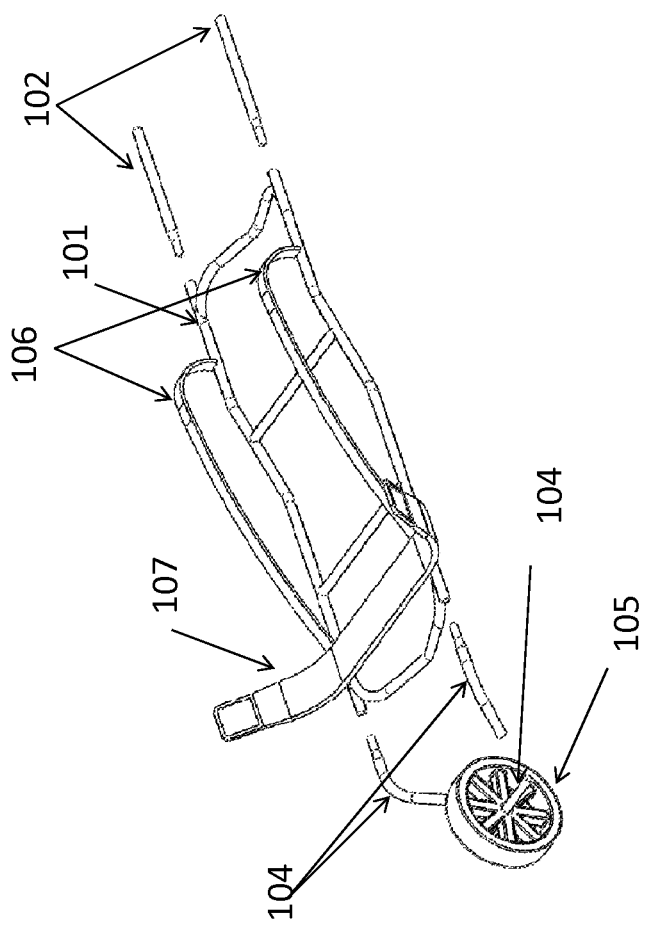
FIG. 1B is a partially exploded view of a portion of the device of FIG. 1A partially converted to a wheelbarrow configuration.

FIG. 1B is a partially exploded view of a portion of the device of FIG. 1A, partially converted to a wheelbarrow configuration. This view includes the frame 101, straps 106, and belt 107 of the backpack configuration while the satchel has been removed. Further, the embodiment of FIG. 1B illustrates a handle assembly 102, a wheel mounting assembly 104, and wheel 105 that may be coupled to the frame 101 in the wheelbarrow configuration. In some embodiments a user may leave the straps 106 and belt 107 coupled to the frame 101 in the wheelbarrow configuration; in other instances these components may be removed as a step in converting the device from a backpack configuration to a wheelbarrow configuration.

Figure 1C:
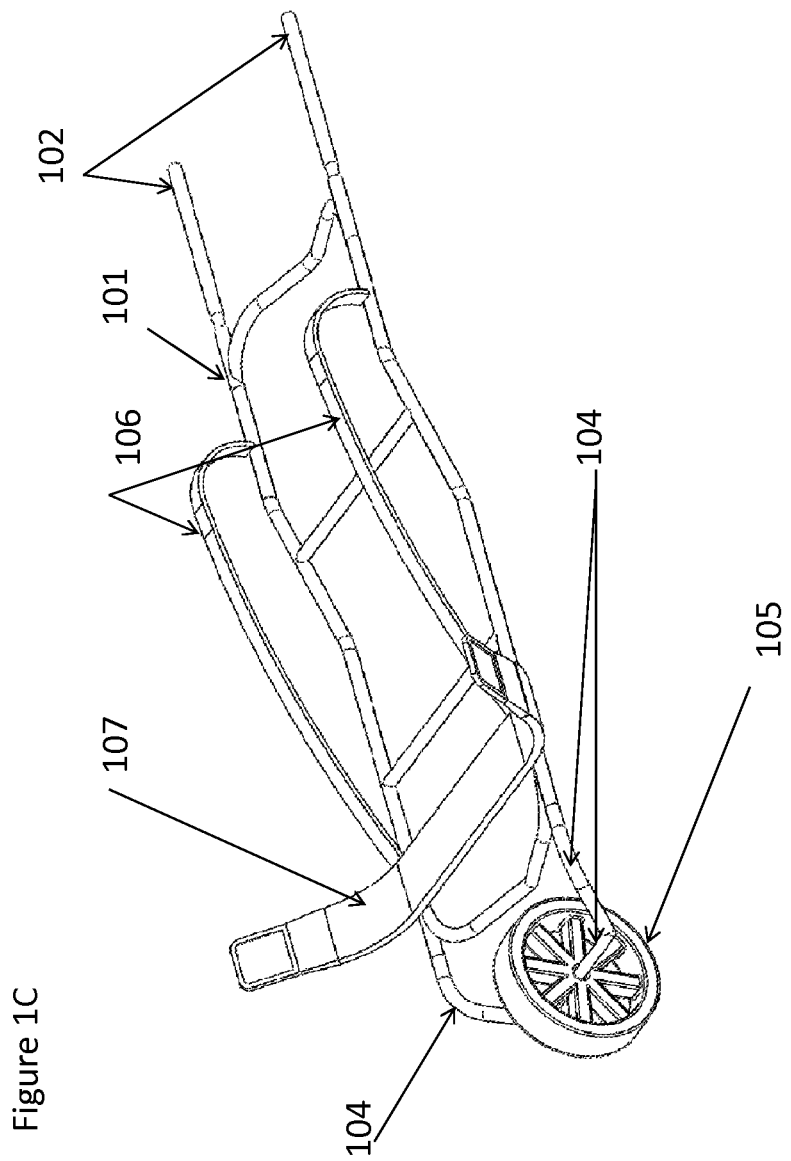
FIG. 1C is a perspective view of the device of FIGS. 1A and 1B in an assembled wheelbarrow configuration.

FIG. 1C is a perspective view of the device of FIG. 1B in an assembled configuration. Components of this embodiment include the wheel 105, the wheel mounting assembly 104, and the handle assembly 102. The frame 101, shoulder straps 106, and belt 107 are also shown. It is within the scope of this disclosure to couple shoulder straps 106, a belt 107, and/or a pack or satchel 109 to any of the embodiments herein disclosed, regardless of whether they illustrate all exemplary embodiments. It should also be noted that the handle assembly 102 may comprise components having various shapes, diameters, and lengths depending on the embodiment; the illustrated embodiment is exemplary only, and many others are anticipated. Other embodiments may include handle assemblies with differing components; it is within the scope of this disclosure to utilize any of the exemplary handle configurations with any embodiment. Similarly, the components of the wheel assembly 104 are also exemplary, and any illustrated or described features thereof are applicable to any embodiment disclosed herein. In some instances the wheel assembly 104 may comprise, for example, mounting brackets and one or more axles.

Figure 1D:
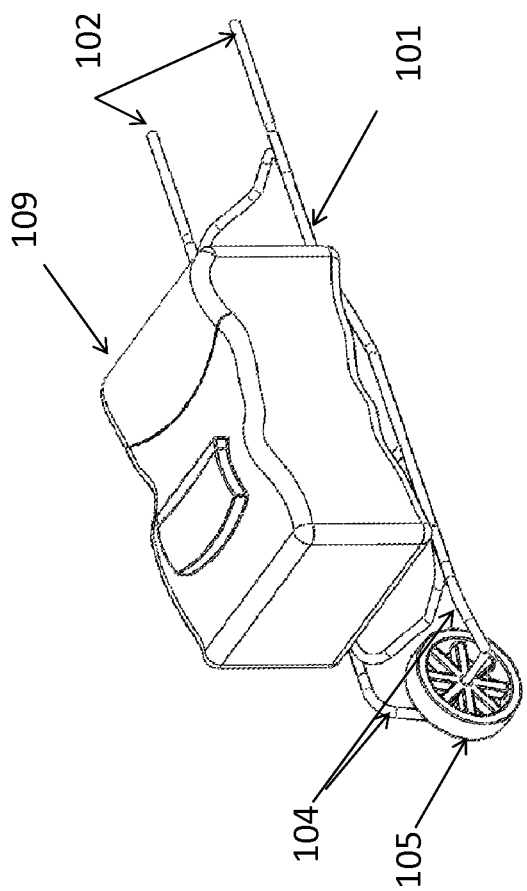
FIG. 1D is a perspective view of the device of FIG. 1C in an alternate configuration.

FIG. 1D is a perspective view of the device of FIG. 1C, including the frame 101, handle assembly 102, wheel 105, and wheel mounting assembly 104. In the embodiment of FIG. 1D, the shoulder strap and belt have been removed while the satchel 109 is coupled to the frame 101. In this, or any embodiment, the satchel 109 may be coupled to the frame 101, and configured to retain a load, in either the backpack or wheelbarrow configuration.

Figure 1E:
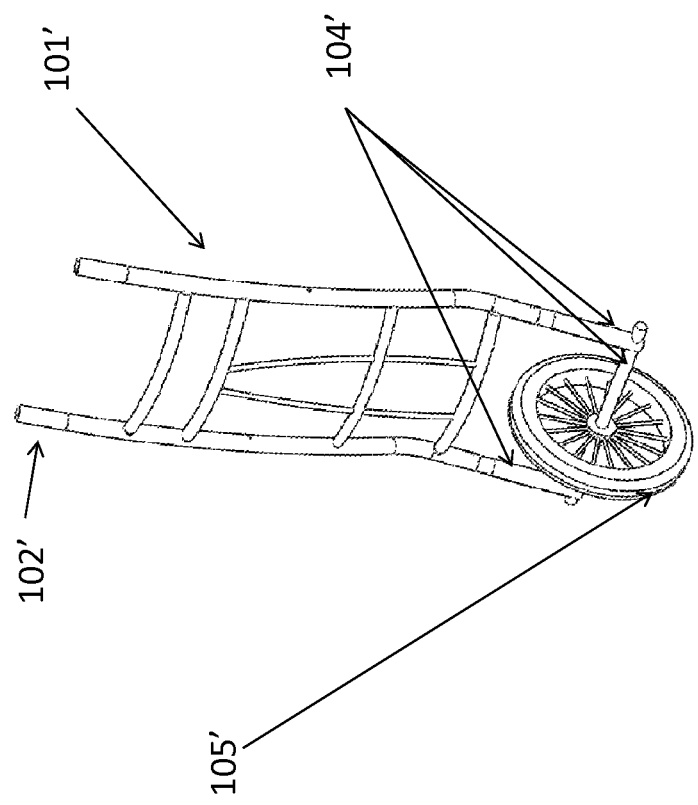
FIG. 1E is a perspective view of another embodiment of an integrated transportation device in a wheelbarrow configuration.

FIG. 1E is a alternative embodiment of a frame 101' that may be coupled to a wheel 105' through use of a wheel mounting assembly 104' in a transportation device. As shown by a comparison of the embodiment of FIGS. 1A-1D with the embodiment of FIG. 1E, the basic structure and mode of operation of the device is not dependent on the particular size, shape, or arrangement of the subcomponents. Furthermore, the embodiment of FIG. 1E, or any of the embodiments disclosed herein, may be altered such that the wheel mounting assembly 104' and/or handle assembly 102' are configured such that they may remain coupled to the frame 101' in the backpack configuration as well as in the wheelbarrow configuration. These components may be configured such that their size, shape, or placement, for example, do not interfere with the use of the frame 101' in the backpack configuration. In such embodiments, these components may or may not be integral parts of the frame 101' and may or may not be configured to be removable. Furthermore, in some embodiments the wheel 105' may be configured such that it may remain coupled to the frame 101' in the backpack configuration.

Figure 2A:
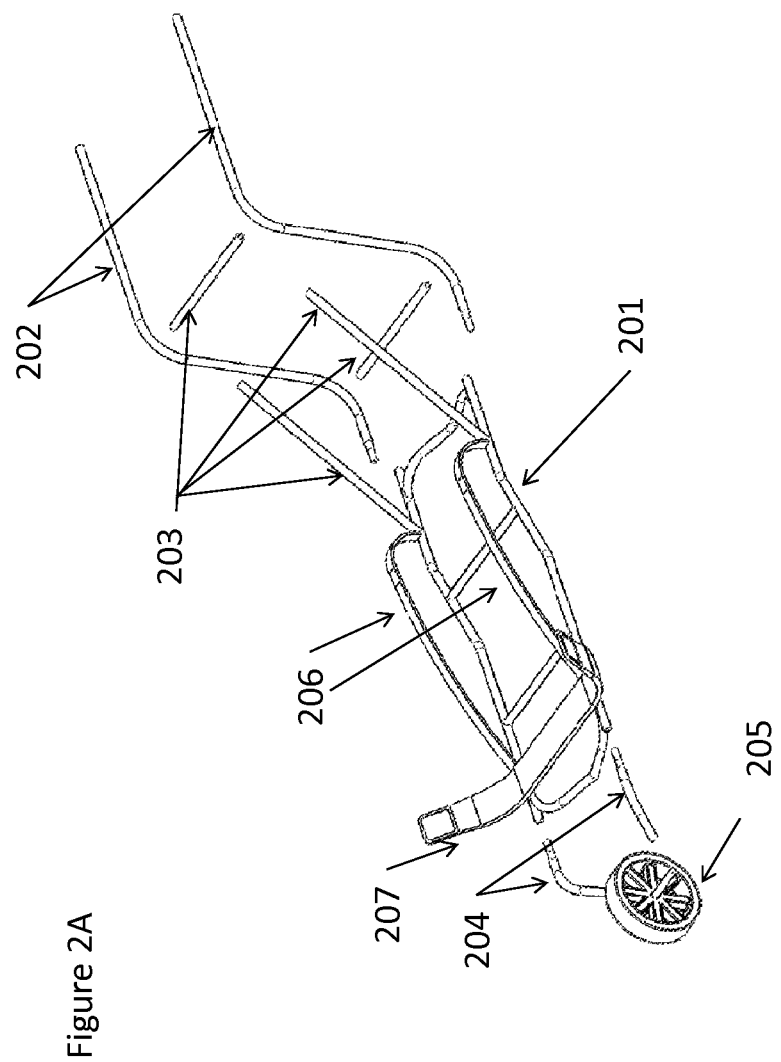
FIG. 2A is a partially exploded view of another embodiment of an integrated transportation device.

FIG. 2A is a partially exploded view of another embodiment of a transportation device that can, in certain respects, resemble components of the device described in connection with FIGS. 1A-1 and 1E, above. It will be appreciated that all the illustrated embodiments may have analogous features. Accordingly, like features are designated with like reference numerals, with the leading digits incremented to "2." (For instance, the frame is designated "101" in FIG. 1A, and an analogous frame is designated as "201" in FIG. 2A.) Relevant disclosure set forth above regarding similarly identified features thus may not be repeated hereafter. Moreover, specific features of the transportation device and related components shown in FIG. 2A may not be shown or identified by a reference numeral in the drawings or specifically discussed in the written description that follows. However, such features may clearly be the same, or substantially the same, as features depicted in other embodiments and/or described with respect to such embodiments. Accordingly, the relevant descriptions of such features apply equally to the features of the transportation device of FIG. 2A. Any suitable combination of the features, and variations of the same, described with respect to the transportation device and components illustrated in FIGS. 1A-1E, can be employed with the device and components of FIG. 2A, and vice versa. This pattern of disclosure applies equally to further embodiments depicted in subsequent figures and described hereafter.

FIG. 2A illustrates an embodiment having a frame 201, a handle assembly 202, a wheel mounting assembly 204, a wheel 205, shoulder straps 206, and a belt 207. Additionally, this embodiment further comprises reinforcing braces 203. Such braces 203 may be disposed to add support or strength to the device, for example, to reinforce the coupling of the handle assembly 202 to the frame 201. Members comprising the braces 203 may be flexible (i.e., webbed straps) or rigid (i.e., stiff tubular members such as steel or composite materials).

The embodiment of FIG. 2A, as well as all other embodiments described herein, may be converted to a backpack configuration though it is illustrated in a wheelbarrow configuration. Similarly, any embodiment herein shown in a backpack configuration may be converted to a wheelbarrow configuration as well.

In the embodiment of FIG. 2A, the handle assembly 202 is located at a distance from the axle of the wheel 205 such that the center of gravity of the loaded embodiment is lower and therefore creates what may be a more stable embodiment in some applications.

Figure 2B:
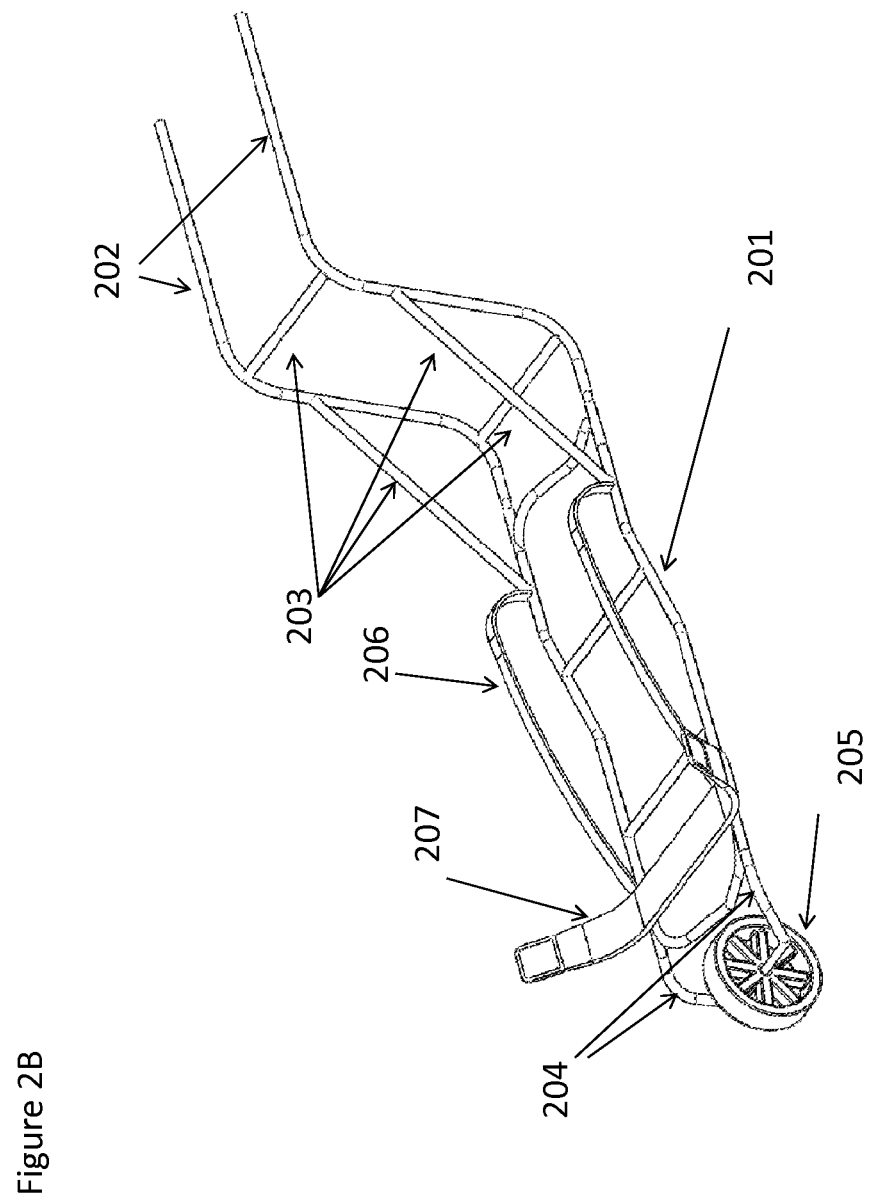
FIG. 2B is a perspective view of the device of FIG. 2A in an assembled wheelbarrow configuration.
Figure 2C:
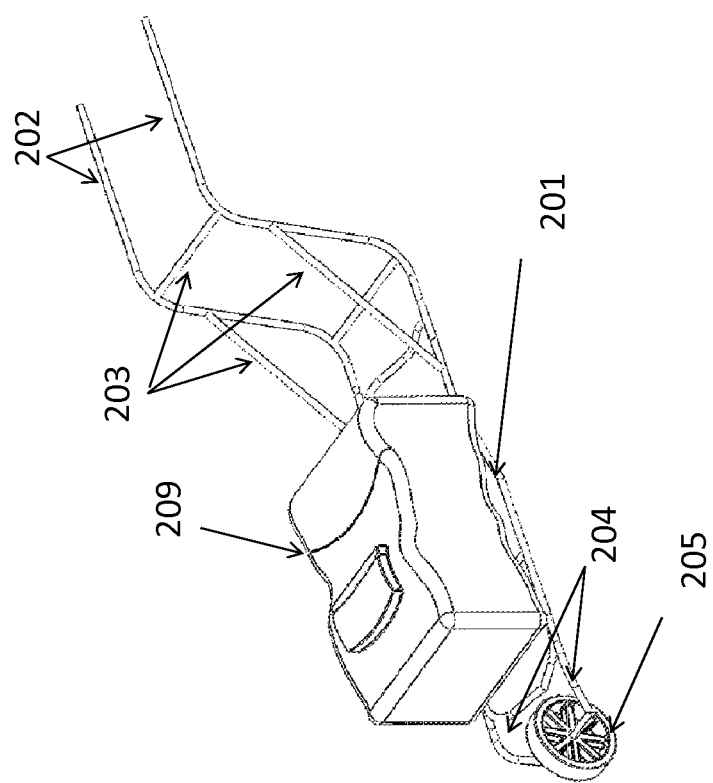
FIG. 2C is a perspective view of the device of FIG. 2B is an alternate configuration.
Figure 2D:
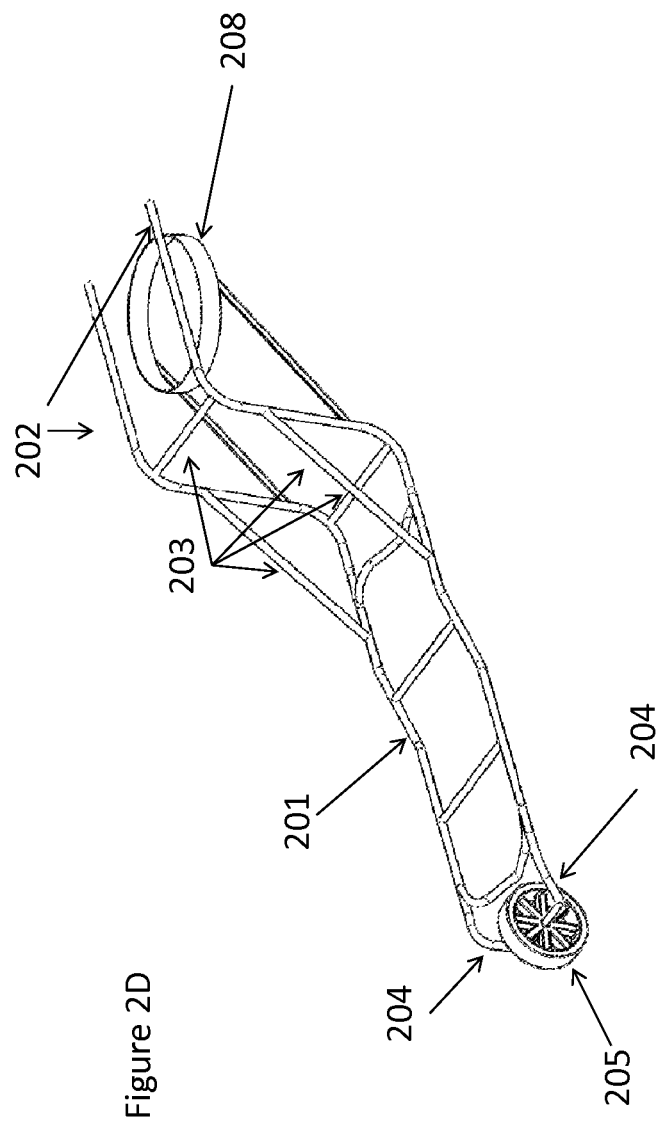
FIG. 2D is a perspective view of the device of FIG. 2B is another alternate configuration.

FIGS. 2B-2D illustrate alternate configurations of the device shown in FIG. 2A. Like the configuration of 2A, each of these embodiments is configured such that the wheel 205 is positioned with respect to the frame 201 in order to optimize the center of gravity or to affect the load point of the assembly for stability or load carrying capacity. Each of FIGS. 2B-2D illustrates the device configured with a frame 201, a handle assembly 202, braces 203, a wheel mounting assembly 204, and a wheel 205. In the configuration of FIG. 2B shoulder straps 206 and a belt 207 are also coupled to the frame 201. In the embodiment of FIG. 2C, a satchel 209 is coupled to the frame 201.

In the embodiment of FIG. 2D a waist harness 208 is coupled to the frame 201 such that it can be used in cooperation with the handle assembly 202. Specifically, the harness 208 may be configured such that load distribution on the user can be facilitated. The harness 208 may be coupled to the frame 201, the handle assembly 202, or any other portion of the device. The harness 208 may be coupled through the use of straps or auxiliary members. Various embodiments of load carrying accoutrements may be utilized in place of the waist harness 208. One possible embodiment of such load carrying implements would be reattachment of shoulder straps 206 from FIG. 2B, for example, such that they can be used cooperatively with the handle assembly 202 in the wheelbarrow configuration. Such implements and variations may be included in any embodiments described herein.

Figure 3A:
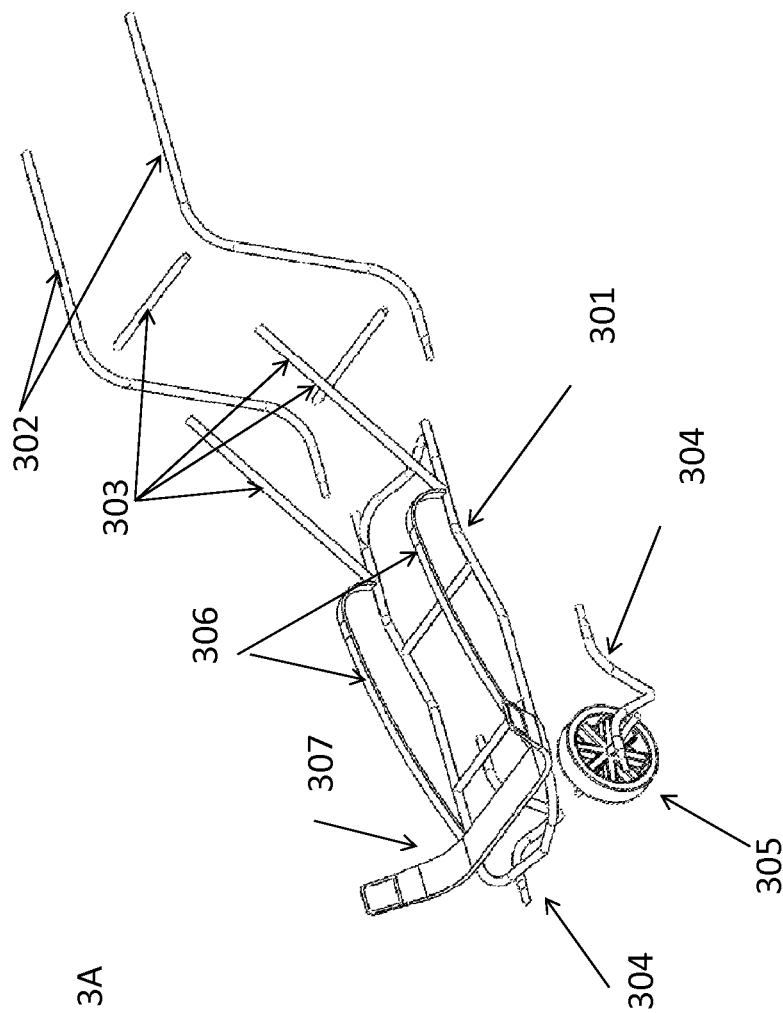
FIG. 3A is a partially exploded view of another embodiment of an integrated transportation device.
Figure 3B:
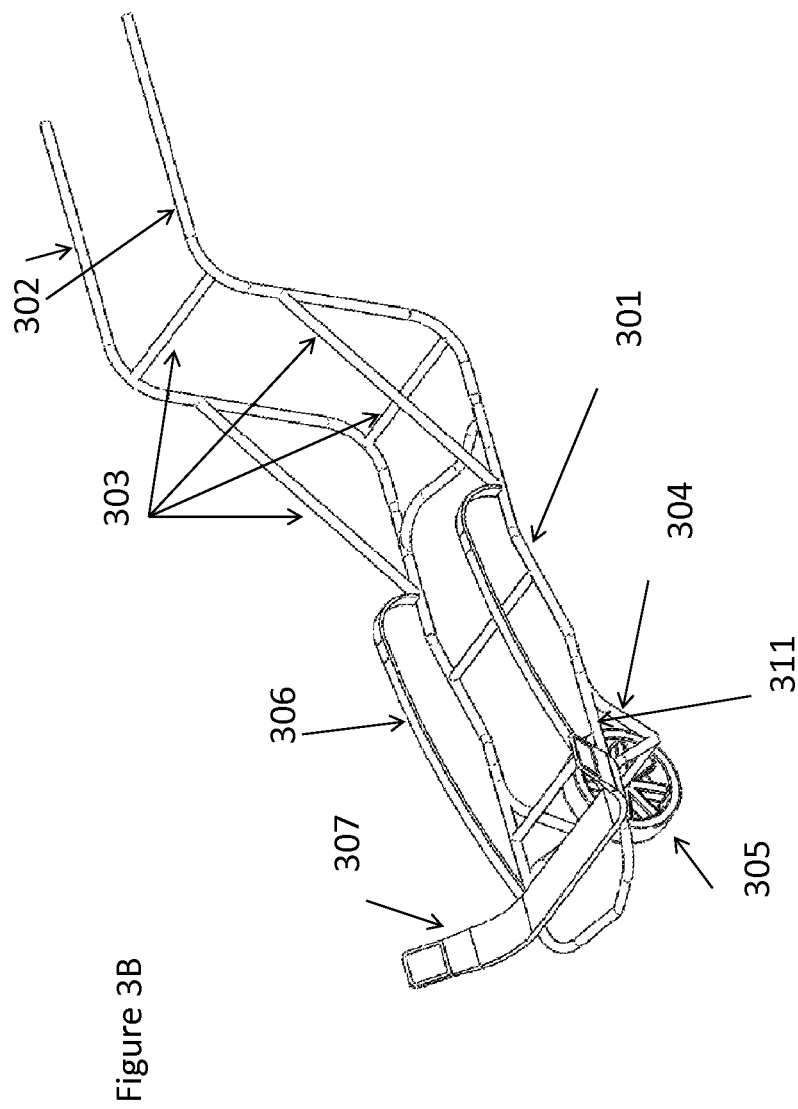
FIG. 3B is a perspective view of the device of FIG. 3A in an assembled wheelbarrow configuration.

FIG. 3A is a partially exploded view of another embodiment of a transportation device, while FIG. 3B shows the same embodiment assembled in a wheelbarrow configuration. These figures illustrate the device configured with a frame 301, a handle assembly 302, braces 303, a wheel mounting assembly 304, a wheel 305, shoulder straps 306, and a belt 207.

In these embodiments, the wheel 305 is further moved toward the longitudinal center of the frame for stability or load capacity (as compared with, for example, the embodiment of FIG. 2A). It should be understood that the wheel 305 and the wheel mounting assembly 304 may be moved to various locations with respect to the frame 301 depending upon the desired performance of the assembly. Connection points 311, as indicated in FIG. 3B, may be provided in connection with the frame 301 to provide mounting locations for the wheel mounting assembly 304. In some embodiments a frame 301 may have multiple prepared connection points 311, allowing a user to position the wheel 305 depending on the nature of the load and task. These connection points 311 may be fixed based on hardpoints or mounting points created in the original manufacture of the frame, may be variable via multiple hardpoints created during original manufacture of the frame, or may be variable via a bolt on wheel 305 and wheel mounting assembly 304 where the user may mount the wheel 305 at a preferred location.

In some embodiments, a frame may be prepared with one, two, three, four, or any other number of locations configured to the allow the user to mount the wheel at those points. For example, a frame may have multiple positions along the longitudinal and/or transverse axes of the frame at which a user may attach a wheel. In some instances a user will determine the position best suited for the wheel based on the load size, transportation requirements, conditions, and so on. This feature is applicable to any of the embodiments herein disclosed.

Figure 3C:
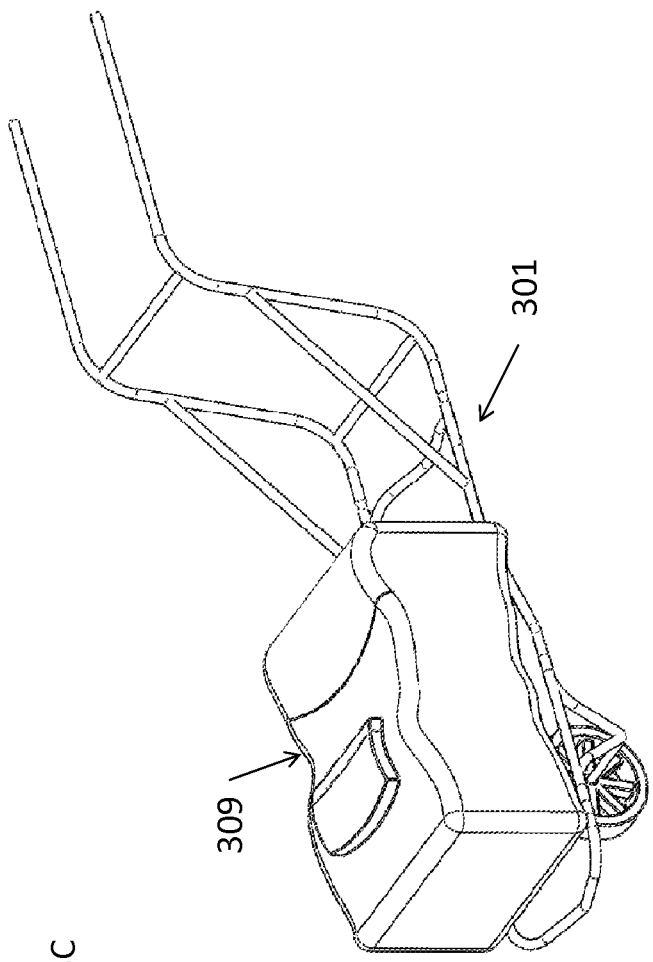
FIG. 3C is a perspective view of the device of FIG. 3B is an alternate configuration.

FIG. 3C illustrates the device of FIG. 3A in the alternative configuration where a satchel 309 is coupled to the frame 301.

Figure 4A:
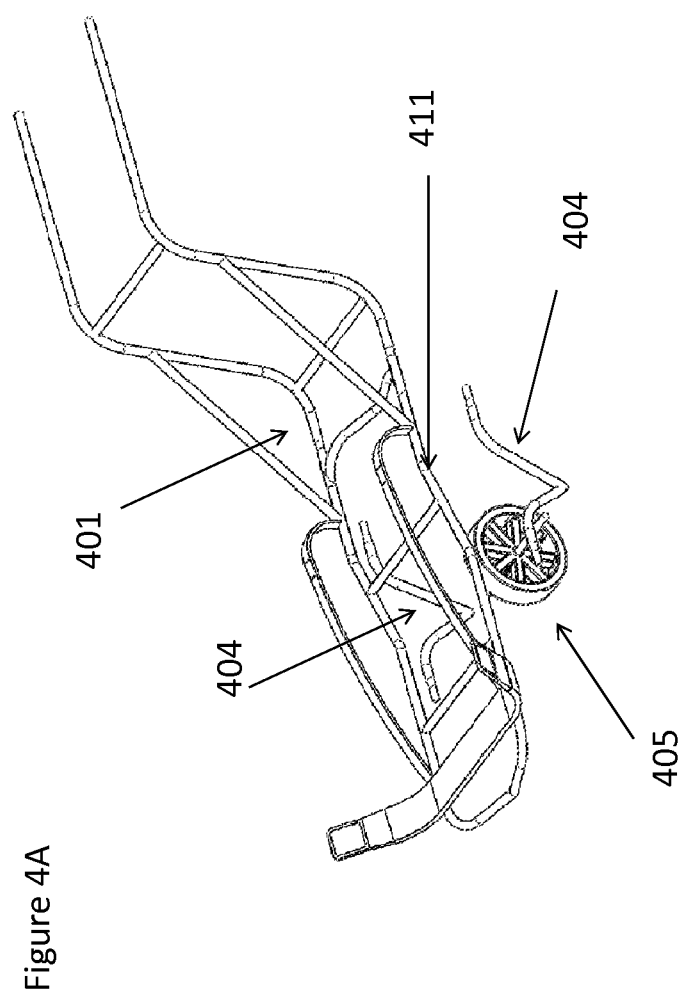
FIG. 4A is a partially exploded view of another embodiment of an integrated transportation device.
Figure 4B:
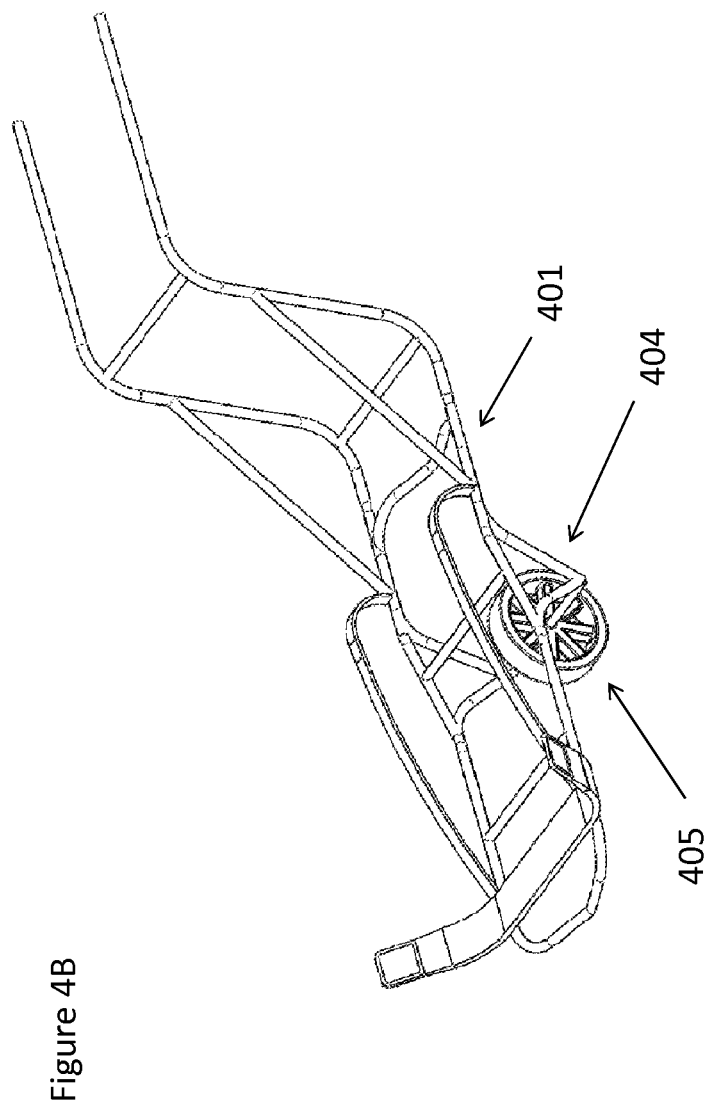
FIG. 4B is a perspective view of the device of FIG. 4A in an assembled wheelbarrow configuration.
Figure 4C:
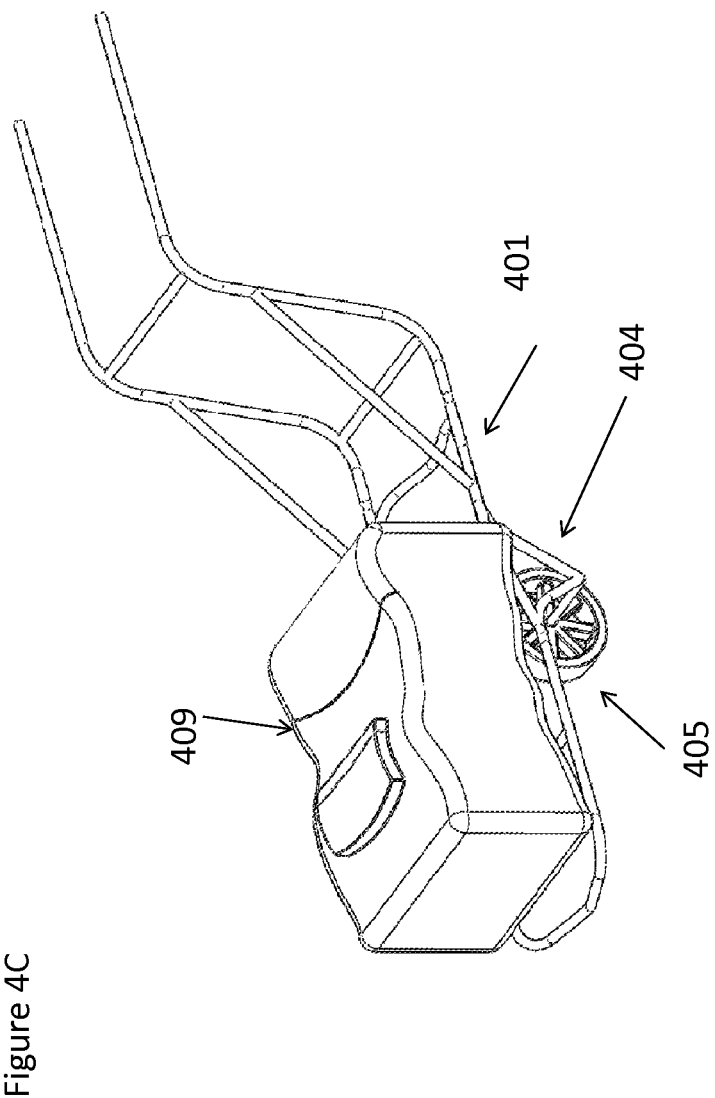
FIG. 4C is a perspective view of the device of FIG. 4B is an alternate configuration.

FIGS. 4A-4C illustrate another embodiment of a transportation device, in different configurations. As compared to the device of FIGS. 3A-3C, the embodiment of FIGS. 4A-4C is configured such that the wheel 405 is coupled to the frame 401 even closer to the longitudinal midpoint of the frame 401. As with other embodiments, connection points 411 may be provided to facilitate coupling of the wheel 405 and wheel mounting assembly 404 at the illustrated location, as well as other locations on the frame 401. In the embodiment of FIG. 4C, a satchel 409 is coupled to the frame 401.

Figure 5A:
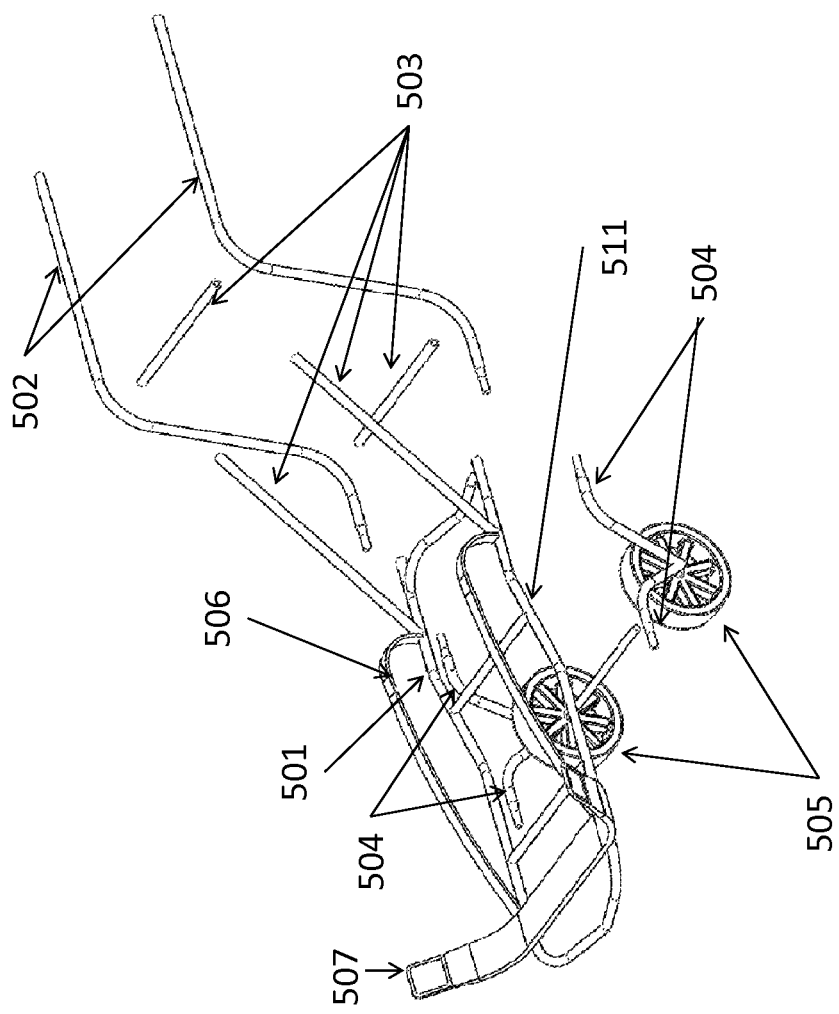
FIG. 5A is a partially exploded view of another embodiment of an integrated transportation device.
Figure 5B:
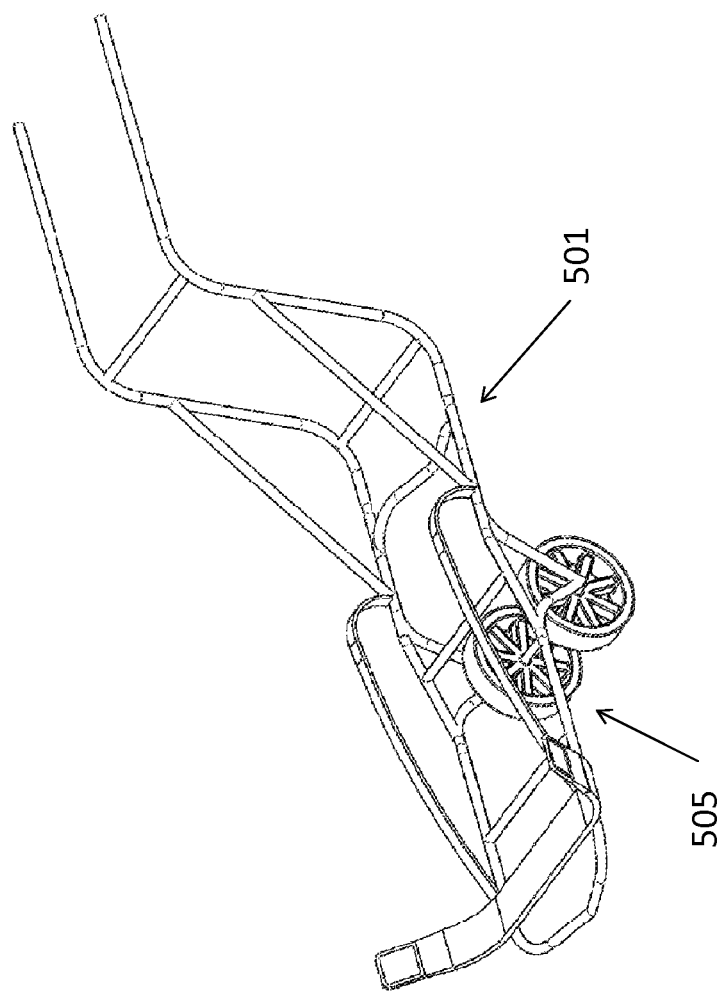
FIG. 5B is a perspective view of the device of FIG. 5A in an assembled wheelbarrow configuration.
Figure 5C:
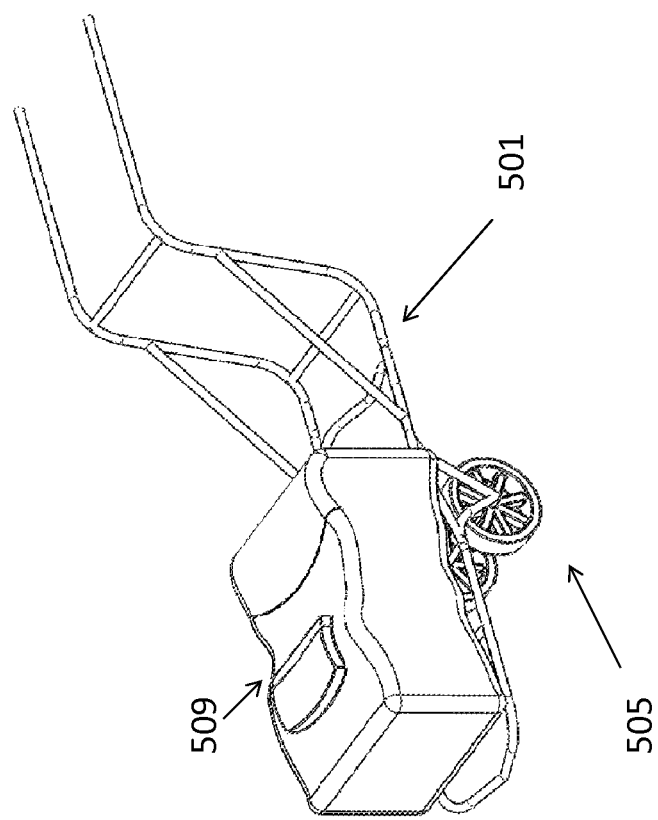
FIG. 5C is a perspective view of the device of FIG. 5B is an alternate configuration.

FIGS. 5A-5C illustrate another embodiment of a transportation device, in different configurations. As shown in FIG. 5A, this embodiment includes a frame 501, a handle assembly 502, and braces 503. In some configurations (like FIG. 5A), shoulder straps and a belt 507 may be included. Likewise, FIG. 5A indicates how connection points 511 may be utilized in positioning and coupling a wheel mounting assembly 504 to the frame 501. The embodiment of FIG. 5C also includes a satchel 509.

In the embodiment of FIGS. 5A-5C generally, two wheels 505 are provided. These wheels 505 may be disposed on a single axle that is a component of a wheel mounting assembly 504. In some embodiments, multiple wheels may provide for stability. In the illustrated embodiment, for example, the wheels 505 are located at the same longitudinal position along the frame 501 but offset in the transverse direction. This may provide lateral stability to the device in the wheelbarrow configuration. It should be noted that, although the single axle is illustrated in the center of the frame, the axle could be assembled anywhere along the frame similar to, for example, the embodiments of FIG. 2A or 3A. Further, in some embodiments, more than two wheels 505 could be added to a single axle.

Figure 6A:
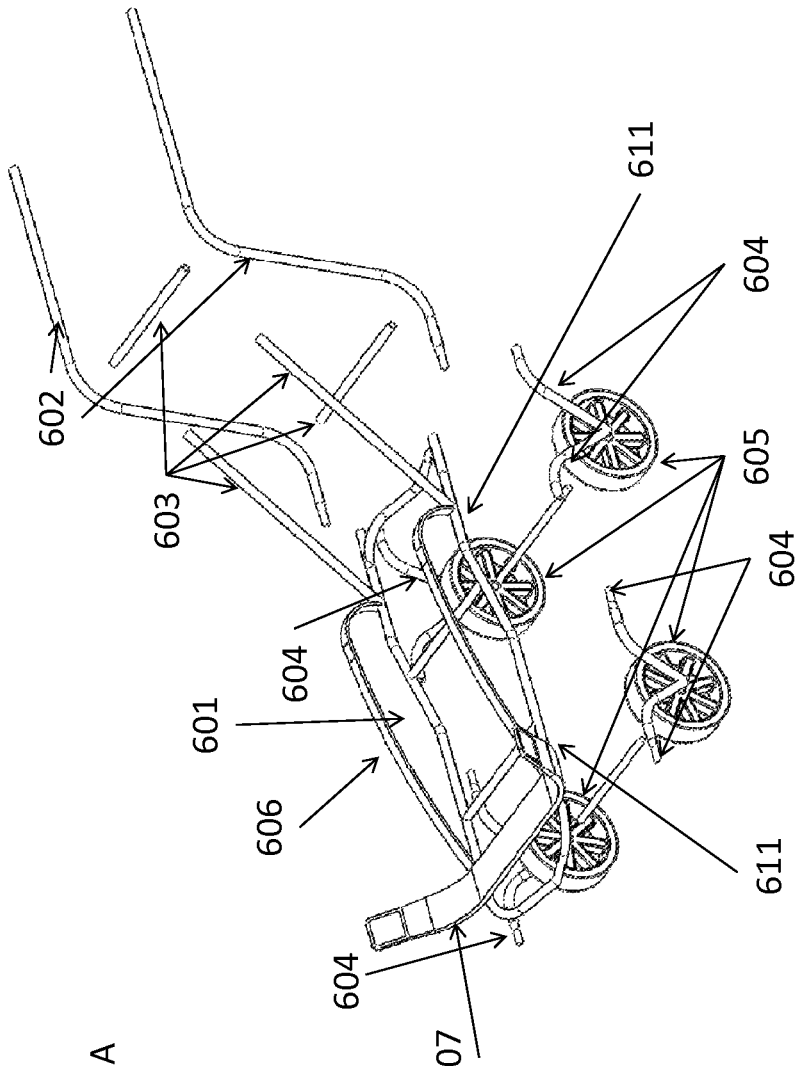
FIG. 6A is a partially exploded view of another embodiment of an integrated transportation device.
Figure 6B:
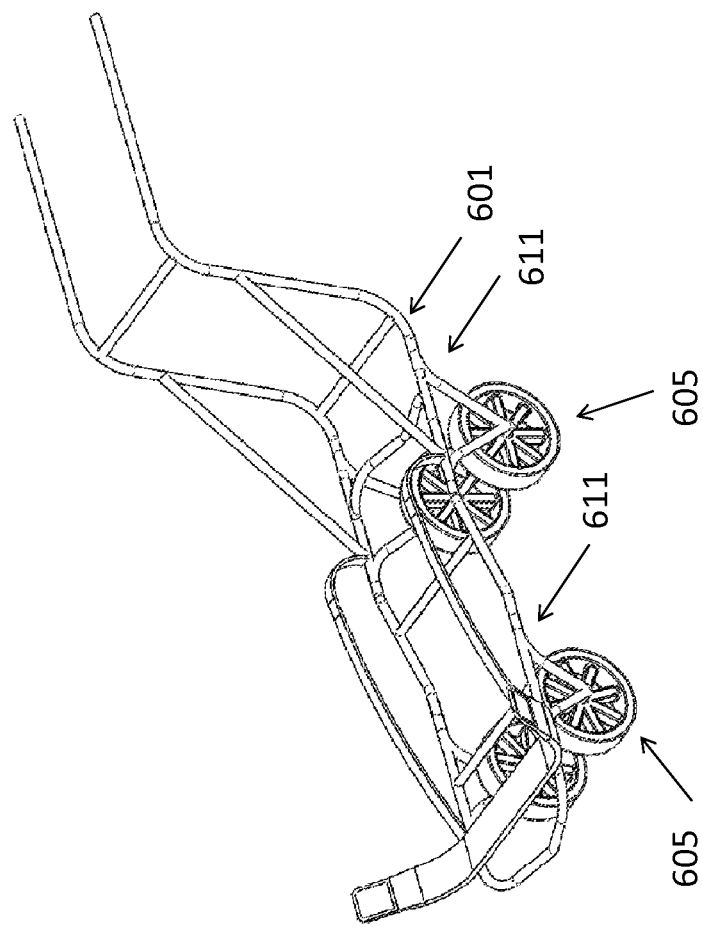
FIG. 6B is a perspective view of the device of FIG. 6A in an assembled wheelbarrow configuration.
Figure 6C:
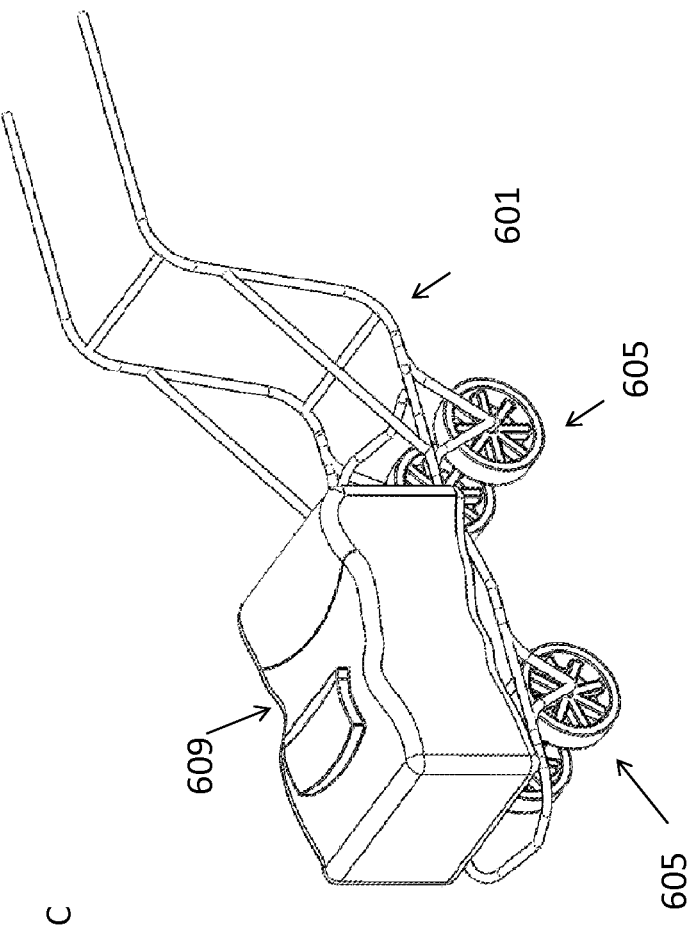
FIG. 6C is a perspective view of the device of FIG. 6B is an alternate configuration.

FIGS. 6A-6C illustrate yet another embodiment of a transportation device, in different configurations. As shown in FIG. 6A, this embodiment includes a frame 601, a handle assembly 602, and braces 603. In some configurations (like FIG. 6A), shoulder straps 606 and a belt 607 may be included. The embodiment of FIG. 6C also includes a satchel 609.

In this embodiment generally, there exists four wheels 605 and two wheel mounting assemblies 604. It should be noted as with the embodiment of FIGS. 5A-5C, and other embodiments, that the positioning of the wheel mounting assemblies 604 and the number of wheels 605 can be varied in various embodiments. Further, in the illustrated embodiment, mounting locations 611 are provided to facilitate coupling of the wheel mounting assemblies 604 to the frame 601. The illustrated embodiment is configured such that two wheels 605 are coupled via each of two wheel mounting assemblies 604, each wheel mounting assembly having one axle. In other embodiments more or fewer axles and/or wheel mounting assemblies 604 may be provided.

Figure 7A:
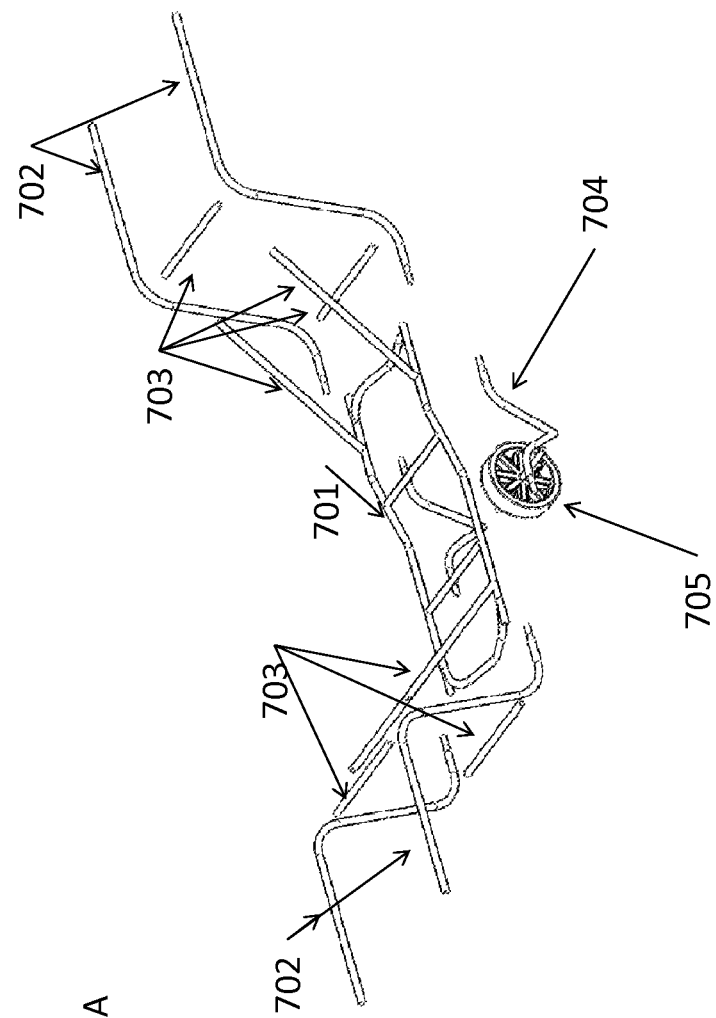
FIG. 7A is a partially exploded view of another embodiment of an integrated transportation device.
Figure 7B:
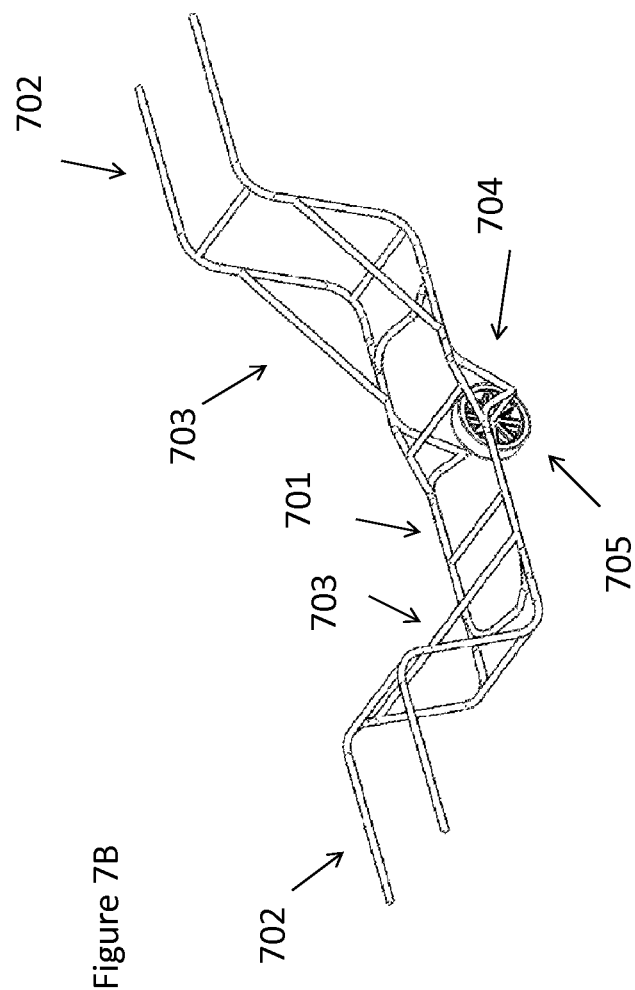
FIG. 7B is a perspective view of the device of FIG. 7A in an assembled wheelbarrow configuration.

FIGS. 7A and 7B show an embodiment comprising a frame 701, two handle assemblies 702, and two sets of braces 703 used in connection with a wheel mounting assembly 704 and a wheel 705. In embodiments with two sets of handle assemblies, one assembly may be positioned at each end longitudinal end of the frame, thereby facilitating use by two or more persons. It is anticipated that various handle assemblies 702, wheels 705, and wheel mounting assemblies 704 may be used in connection with this embodiment. Similarly, multiple wheels 705 may be utilized in connection with this embodiment.

Figure 8E:
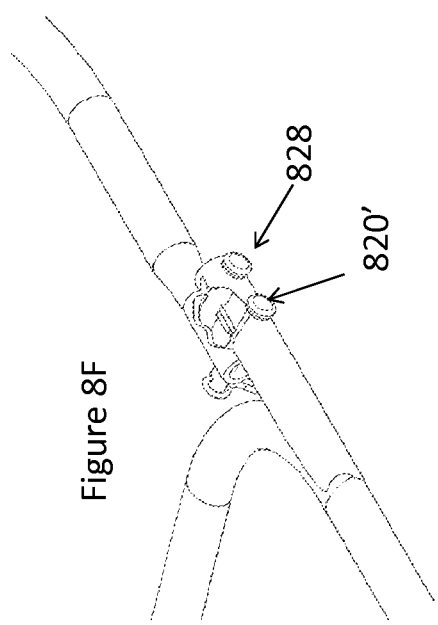
FIG. 8E is a perspective view of another embodiment of an attachment mechanism.

FIGS. 8A-8G show exemplary embodiments of components that can be utilized to connect or pivot the elements of the assembly. These devices may be used in cooperation with connection points (for example connection points 611 of FIG. 6A) in some embodiments. FIG. 8A illustrates a method by which the components are pinned together utilizing a removable pin 820, FIG. 8B illustrates a "twist lock" assembly mechanism 822, FIG. 8C illustrates a "spring plunger" assembly mechanism 824, and FIG. 8D illustrates a "wing nut" assembly mechanism 826.

Figure 8G:
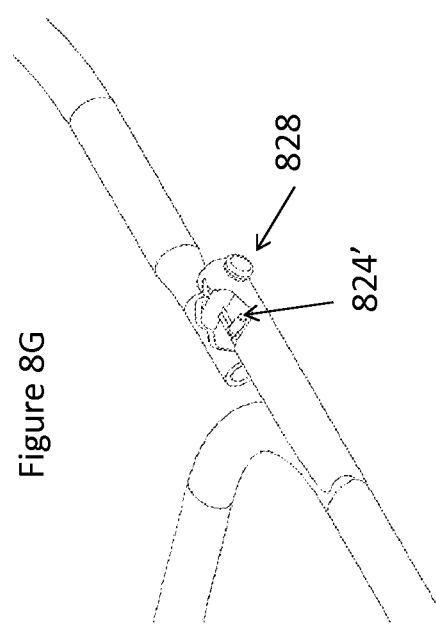
FIG. 8G is a perspective view of another embodiment of an attachment mechanism.
Figure 8F:
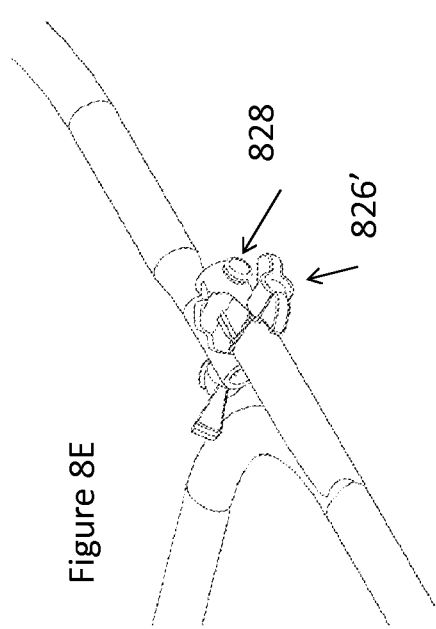
FIG. 8F is a perspective view of another embodiment of an attachment mechanism.

FIGS. 8E-8G illustrate embodiments where a pivot pin 828 is provided in connection with another coupling mechanism. In these embodiments a removable mechanism such as a wingnut (826' in FIG. 8E), a removable pin (820' in FIG. 8F), and/or a spring plunger mechanism (824' in FIG. 8G) may be decoupled to allow adjacent components to pivot with respect to each other about the pivot pin 828. Thus, components may be converted or decoupled by folding or pivoting, in addition to the complete removal of adjacent components. Any of the components described in any embodiment herein may be configured to be completely removable from adjacent components, or may be configured to pivot, hinge, fold up, or collapse, or may slide into or otherwise remain at least partially coupled to adjacent components in multiple configurations. Additionally, various other embodiments of attachment mechanisms can be utilized for assembly in addition to the exemplary components and embodiments shown.

Figure 9C:
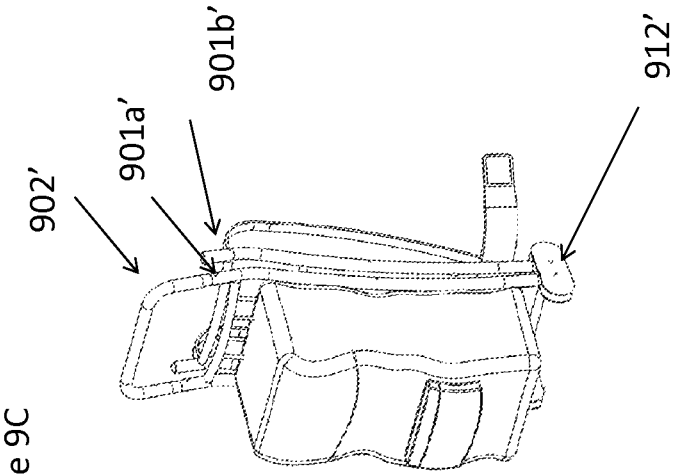
FIG. 9C is a perspective view of an alternate embodiment of the device of FIG. 9B.

FIGS. 9A-9M illustrate an embodiment of the invention in which a frame 901a is used in cooperation with a secondary frame 901b, the two components connected via a hinge 912 or hinge plate 912' (FIG. 9C) that allows for various configurations to be realized. FIG. 9A illustrates this embodiment, including, the frame 901a, the secondary frame 901b, a handle assembly 902, a wheel mounting assembly 904, shoulder straps 906, a belt 907, and a satchel 909. As illustrated in FIG. 9A, the device is substantially in the backpack configuration, though certain components are shown in an "exploded" type view. In some embodiments, including the embodiment of FIG. 9A, the handle assembly 902 and wheel mounting assemblies 904 may remain coupled to the frame 901a while the device is disposed in the backpack configuration. It is within the scope of this disclosure to couple the handle assembly 902, wheel mounting assembly 904, shoulder straps 906, belt 907, and/or satchel 909 to either the frame 901a or the secondary frame 901b. The desired configuration may depend on the relative position of these latter two components with respect to each other.

Figure 9B:
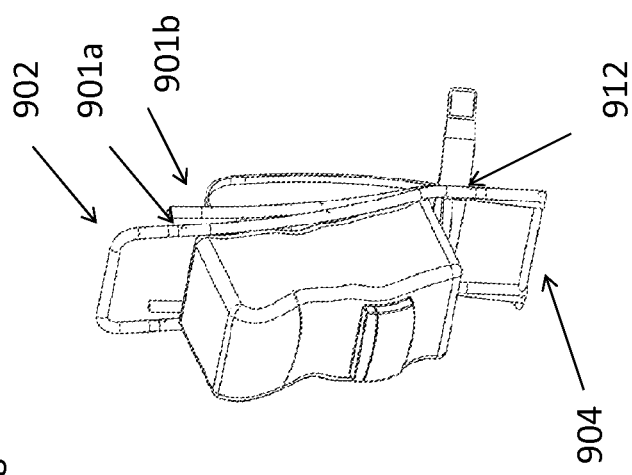
FIG. 9B is a perspective view of the device of FIG. 9A in an assembled backpack configuration.

FIGS. 9B and 9C illustrate how the device of FIG. 9A may be assembled in the backpack configuration with the handle assembly 902 and/or the wheel mounting assembly 904 coupled to the frame 901a or the secondary frame 901b. In the embodiment of FIG. 9B the frame 901a is coupled to the secondary frame 901b by a hinge 912, while in the embodiment of FIG. 9C the components are coupled by a hinge plate 912'. The embodiment of FIG. 9C may have many components that are substantially similar to those in the embodiment of FIG. 9B, though there may be some variation between components and arrangements. Thus, analogous components are denoted by a "prime" marker (i.e., 909 and 909') in these embodiments, though disclosure relative to any component may apply to its analog. This pattern is used for FIGS. 9A-9M.

In some embodiments, the devices of FIGS. 9B and 9C may be converted to a wheelbarrow configuration, essentially by coupling a wheel 905, 905' to the device. Referring additionally to FIGS. 9D and 9E, it will be noted that embodiments that utilize a hinge 912 versus a hinge plate 912' may be used in connection with variants to the wheel mounting assembly 904, 904' and wheel 905, 905'. Further these figures show how the satchel 909, 909' and/or handle assembly 902, 902' may be coupled to either the frame 901a, 901a' or to the secondary frame 901b, 901b' depending on the configuration and positioning of these components. Specifically, it should be noted that the relative positions of the frame 901a, 901a' and secondary frame 901b, 901b'—and thus the components that are coupled to each—differ between the embodiment of FIGS. 9B/9D and the embodiment of FIGS. 9C/9E.

FIGS. 9D and 9E illustrate a first wheelbarrow conversion position, where the device is still largely in the backpack configuration form, though each has a wheel 905, 905' attached. Placement of a load within the satchel 909, 909' in this first position may allow a user to use each of these devices as a wheelbarrow in this configuration. Additionally, as illustrated in FIGS. 9F and 9G, the satchel 909, 909' could be removed in these configurations allowing for a load to be placed directly on the frame 901a, 901a' or secondary frame 901b, 901b' for use as a wheelbarrow in the first conversion position.

Figure 9I:
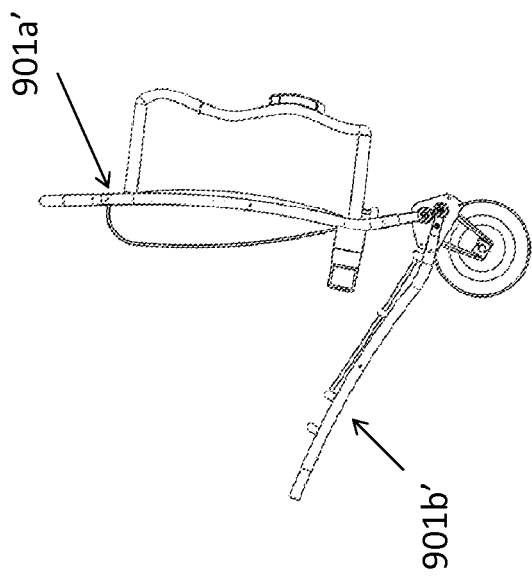
FIG. 9I is a side view of the device of FIG. 9C in a partially converted configuration.
Figure 9H:
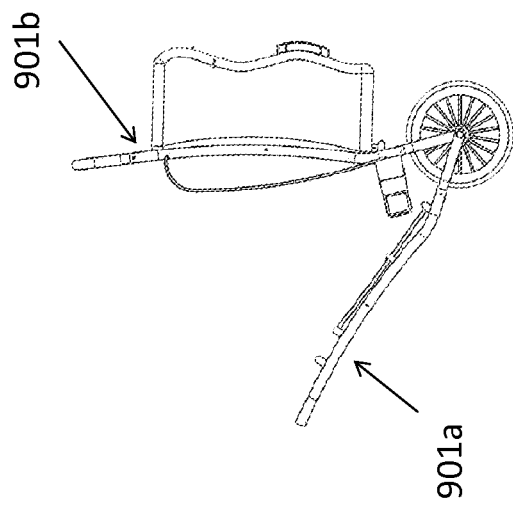
FIG. 9H is a side view of the device of FIG. 9A in a partially converted configuration.

FIGS. 9H and 9I illustrate an intermediate position, where the frame 901a, 901a' is hinged away from the secondary frame 901b, 901b' to transform the device from the first wheelbarrow conversion position to a second wheelbarrow conversion position as shown in FIGS. 9J and 9K.

FIGS. 9J and 9K illustrate the devices of FIGS. 9D/9F and 9E/9G in a second wheelbarrow conversion position. The frame 901a, 901a' and secondary frame 901b, 901b' are separated such that a load may be positioned between these components. This second wheelbarrow conversion position may be understood as an assembly in a cart fashion whereby the components are unfolded to create increased load capacity. In these embodiments, braces 903, 903' may be attached to provide support. Wheel mounting assemblies 904, 904' and wheels 905, 905' are coupled to the device in each embodiment.

Figure 9L:
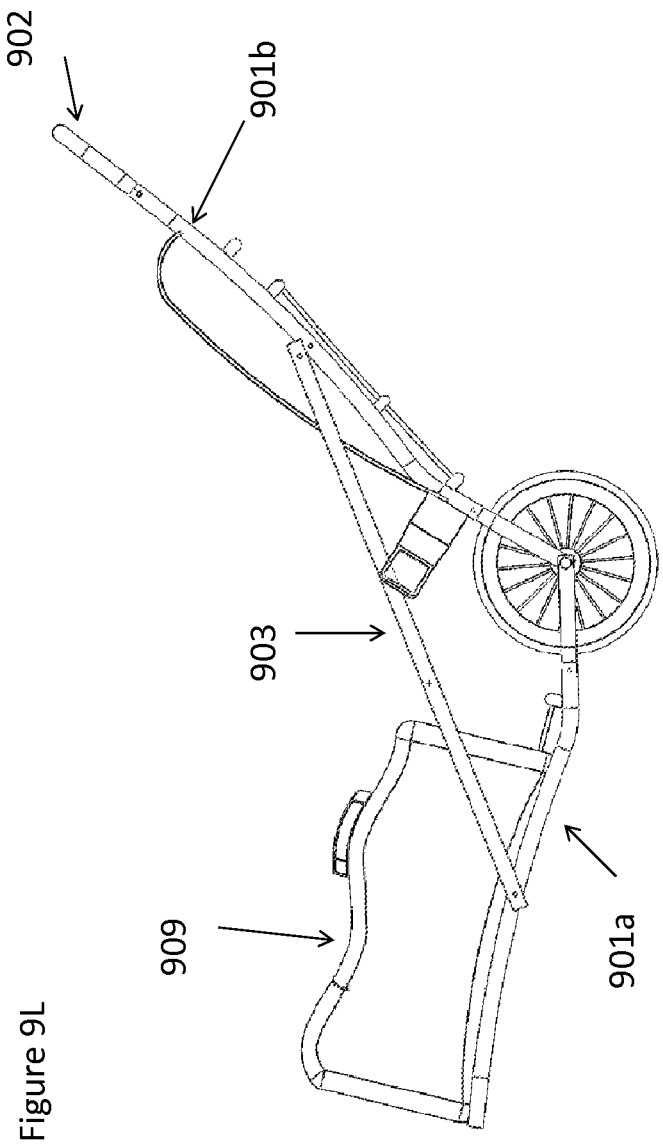
FIG. 9L is a side view of the device of FIG. 9J in an alternate configuration.
Figure 9M:
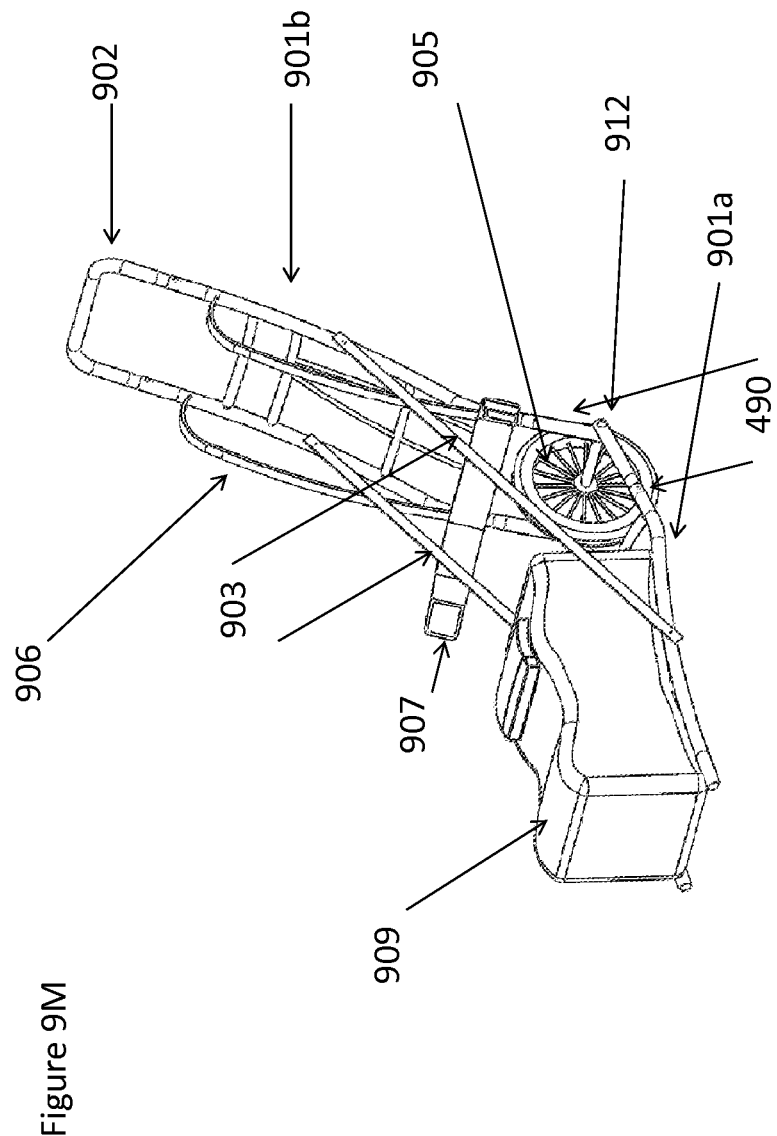
FIG. 9M is a perspective view of the device of FIG. 9L.

FIG. 9L is a side view, illustrating the embodiment of FIGS. 9A/9C/9E/9G/9I fully unfolded into the second wheelbarrow conversion position, with the satchel 909 reattached to the frame 901a and the handle assembly 902 attached to the secondary frame 901b for manipulating the assembly. FIG. 9M is a perspective view of the embodiment of FIG. 9L, showing the frame 901a, secondary frame 901b, handle assembly 902, braces, 903, wheel mounting assembly 904, shoulder straps 906, belt 907, and satchel 909. It is within the scope of this disclosure to add elements such as multiple wheels, harnesses, multiple wheel mounting locations, and so on to hinged embodiments such as that of FIG. 9L.

Figure 10:
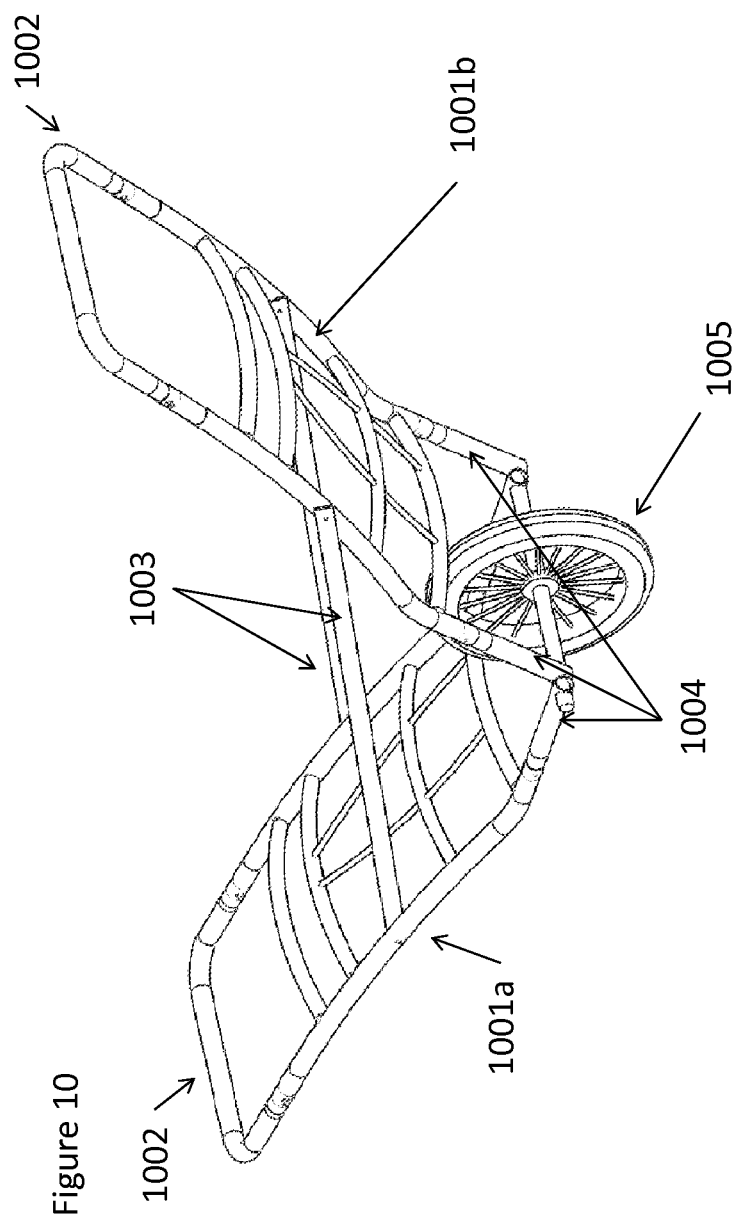
FIG. 10 is a perspective view of another embodiment of a transportation device.

FIG. 10 is a perspective view of a hinged embodiment, analogous to that of FIGS. 9A-9L, that further comprises two handles 1002 to facilitate use of the device by two or more persons. The illustrated embodiment includes a frame 1001a, a secondary frame 1001b, braces 1003, a wheel mounting assembly 1004, and a wheel 1005.

Of course, it is to be understood that the above-described arrangements are only illustrative of the application of the principles of the present invention. Numerous modifications and alternative arrangements may be utilized without departing from the spirit and scope of the present disclosure, and the appended claims are intended to cover such modifications and arrangements. Thus, while the present device has been described above with particularity and detail in connection with exemplary embodiments, it will be apparent to those of ordinary skill in the art that numerous modifications, including, but not limited to, variations in size, material, shape, form, function, manner of operation, assembly, and use, may be made without departing from the principles and concepts set forth herein.

The invention claimed is:

1. An integrated transportation device, comprising:
   a frame comprising,
      a first frame portion,
      a second frame portion pivotably coupled to the first frame portion at a pivot point, and
      a wheel mounting location,
   shoulder straps configured to be removably coupleable by a user to the frame;
   a wheel configured to be removably coupleable by a user to the frame; and
   wherein the wheel is selectively coupleable to the wheel mounting location; and
   wherein the wheel mounting location is adjacent the pivot point and wherein the wheel is directly coupled to the frame when the wheel is mounted at the wheel mounting location.

2. The integrated transportation device of claim 1, further comprising a satchel configured to be removably coupleable by a user to the frame.

3. The integrated transportation device of claim 2, wherein the wheel is configured to be selectively fully disconnected from the frame and stored in the satchel when the satchel is coupled to the frame.

4. The integrated transportation device of claim 1, wherein the frame has a load carrying region offset from the center axis of a handle portion of the frame.

5. The integrated transportation device of claim 4, wherein the wheel mounting location is disposed such that an axis of rotation of the wheel when coupled to the wheel mounting location is parallel an axis of rotation of the first frame portion through the pivot point.

6. An integrated transportation device, comprising:
a frame member comprising,
    a first wheel mounting location,
    a second wheel mounting location, and
    a handle assembly mounting location;
shoulder straps configured to be removably coupleable by a user to the frame member;
a wheel configured to be removably coupleable by a user to the frame member; and
a handle assembly configured to be coupleable by a user to the frame member;
wherein the wheel is selectively coupleable to the first or second wheel mounting location depending on the desired configuration of the device;
the integrated transportation device further comprising:
    a wheel assembly wherein the wheel is configured to be removably coupleable to the wheel assembly and the wheel assembly is configured to be removably coupleable to the first or second wheel mounting location;
    a second wheel configured to be removably coupleable by a user to the wheel assembly; and
    a second wheel assembly, wherein the wheel is configured to be removably coupleable by a user to the wheel assembly and the second wheel is configured to be removably coupleable by a user to the second wheel assembly.

7. The integrated transportation device of claim 6, wherein the wheel assembly is configured to be slidably disposed within a portion of the frame member when the wheel assembly is in a storage configuration.

8. The integrated transportation device of claim 6, further comprising a third wheel configured to be removably coupleable by a user to the frame member.

9. The integrated transportation device of claim 8, further comprising a fourth wheel configured to be removably coupleable by a user to the frame member.

10. The integrated transportation device of claim 6, wherein the handle assembly is fixedly coupled to the handle assembly mounting location.

11. The integrated transportation device of claim 10, wherein the handle assembly mounting location comprises a hinged member, and wherein the handle assembly is configured to be converted from a storage configuration to an operable configuration by rotating a portion of the hinged member.

12. A method of transporting materials, comprising:
obtaining the integrated transportation device of claim 6;
determining whether to couple the wheel to the first or second wheel mounting location depending on load characteristics; and
coupling the wheel to the determined location.

13. The method of claim 12, further comprising coupling the handle assembly to the handle assembly mounting location.

14. The method of claim 12, further comprising, converting the handle assembly from a storage configuration to an operable configuration by rotating a hinged member.

15. The method of claim 12, further comprising:
obtaining a second wheel, and
coupling the second wheel to the frame member.

16. The integrated transportation device of claim 5, wherein the axis of rotation of the wheel when coupled to the first wheel mounting location and the axis of rotation of the first frame portion through the pivot point are collinear.

17. The integrated transportation device of claim 16, wherein the first wheel mounting location is disposed between lateral sides of the first frame portion.

18. The integrated transportation device of claim 6, wherein the second wheel mounting location is positioned adjacent the longitudinal midpoint of the frame member.

19. The integrated transportation device of claim 18, wherein the second wheel mounting location is positioned adjacent the transverse midpoint of the frame member.

20. The integrated transportation device of claim 6, wherein the handle assembly is configured to be slidably disposed within a portion of the frame member when the handle assembly is in a storage configuration.

* * * * *